(12) United States Patent
Gupta et al.

(10) Patent No.: US 11,334,343 B1
(45) Date of Patent: May 17, 2022

(54) SYSTEMS AND METHODS FOR MANAGING RELEASES OF APPLICATIONS IN A COMPUTING ENVIRONMENT

(71) Applicant: Citrix Systems, Inc., Fort Lauderdale, FL (US)

(72) Inventors: R. V. Shouri Gupta, Bangalore (IN); Hemwant Kumar Prasad, Bangalore (IN); Pakshal Kumar H Dhelaria, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/171,476

(22) Filed: Feb. 9, 2021

(51) Int. Cl.
| | |
|---|---|
| *G06F 8/65* | (2018.01) |
| *H04L 29/08* | (2006.01) |
| *G06F 8/61* | (2018.01) |
| *H04L 67/562* | (2022.01) |
| *H04L 67/75* | (2022.01) |

(52) U.S. Cl.
CPC ............... *G06F 8/65* (2013.01); *G06F 8/61* (2013.01); *H04L 67/2809* (2013.01); *H04L 67/36* (2013.01)

(58) Field of Classification Search
None
See application file for complete search history.

(56) References Cited

U.S. PATENT DOCUMENTS

| | | | | |
|---|---|---|---|---|
| 7,428,723 | B2 * | 9/2008 | Greene | .......... G06Q 10/063112 717/103 |
| 8,843,386 | B2 * | 9/2014 | Greene | ................ H04L 63/123 705/7.11 |
| 8,856,087 | B2 * | 10/2014 | Greene | ............. G06Q 10/1093 707/694 |
| 9,495,142 | B2 * | 11/2016 | Koushik | .................. G06F 8/63 |
| 9,985,953 | B2 * | 5/2018 | Koushik | ............ H04L 63/0428 |
| 10,152,211 | B2 * | 12/2018 | Koushik | ................ H04L 63/10 |
| 10,367,802 | B2 * | 7/2019 | Koushik | ............ H04L 63/0853 |
| 10,761,826 | B2 * | 9/2020 | Koushik | .................. G06F 8/60 |
| 2002/0147611 | A1 * | 10/2002 | Greene | .......... G06Q 10/063112 705/1.1 |
| 2002/0165745 | A1 * | 11/2002 | Greene | .................. H04L 67/16 717/103 |
| 2003/0004774 | A1 * | 1/2003 | Greene | .................. H04L 67/16 705/7.14 |

(Continued)

*Primary Examiner* — Ranodhi Serrao
(74) *Attorney, Agent, or Firm* — Foley & Lardner LLP

(57) ABSTRACT

Described herein are systems and methods for managing releases of an application in a controlled manner. A computing environment may include a first and second release of an application service, a message broker, a deployment management service and an application management service. The deployment management service may receive settings for the second release, configure the application management service in the computing environment with the settings, and transmit a request to the message broker to cause the application management service to receive messages published to a first category of the message broker. The application management service may receive a message from the message broker, identify a second category of the message broker corresponding to one of the first release or the second release, and publish the message to the second category of the message broker for consumption by one of the first release or the second release of the application service.

20 Claims, 11 Drawing Sheets

(56) References Cited

U.S. PATENT DOCUMENTS

| | | | |
|---|---|---|---|
| 2011/0213859 A1* | 9/2011 | Greene | G06Q 10/06314 |
| | | | 709/218 |
| 2016/0112497 A1* | 4/2016 | Koushik | G06F 8/61 |
| | | | 726/7 |
| 2016/0132214 A1* | 5/2016 | Koushik | G06F 9/455 |
| | | | 715/741 |
| 2016/0132310 A1* | 5/2016 | Koushik | G06F 8/61 |
| | | | 717/176 |
| 2016/0134616 A1* | 5/2016 | Koushik | H04L 63/08 |
| | | | 726/9 |
| 2016/0241565 A1* | 8/2016 | Greene | G06Q 10/06398 |
| 2016/0308982 A1* | 10/2016 | Greene | G06Q 10/1093 |
| 2017/0060558 A1* | 3/2017 | Koushik | G06F 8/63 |
| 2018/0278602 A1* | 9/2018 | Koushik | G06F 8/60 |

* cited by examiner

SYSTEMS AND METHODS FOR MANAGING RELEASES OF APPLICATIONS IN A COMPUTING ENVIRONMENT

FIELD OF THE DISCLOSURE

The present application generally relates to deployment of new software code, including but not limited to systems and methods for managing releases of application services in a computing environment.

BACKGROUND

Alpha/Beta (AB) testing, canary deployment, or other staged deployments are tools which allow for rollout of new code in a controlled and reliable manner. Deployment failures of the new code may result in downtime. To address the deployment failures, systems typically roll out code in a staged manner.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

The embodiments described herein are directed to systems and methods for managing releases of application services in a computing environment. An analytics or cloud service (such as Citrix Analytics Service) may provide analytical insights of data across various services and products (both internal and external integrated products) within the computing environment. The analytics service may gather data from various sources of the computing environment and builds reports, dashboards, etc. to provide insights to customers and administrators. The data may be processed and analyzed to develop, provision, or otherwise provide analytical solutions to the customers. The data may include information on entities, such as users, devices, network, and shares, etc. along with their correlation, over a period from various products. This data may be analyzed by machine learning models, user defined/custom models defined by administrators and streaming models to detect threats/risks associated with the entities. These models may process the data in real-time (or near real-time) so that preventive measures like actions are taken on the end-user to mitigate threats. The data ingested, received, or otherwise analyzed by the analytics service may be stored in various data stores like SQL, Druid, Graph, Hive etc. based on its nature and usability.

As most of the processing within the computing environment is asynchronous across the models built, components developed and other advanced services of the computing environment, the mode of communication between these streaming applications, services, and microservices is through message brokers. As such, there typically is no end-user interaction for most of the internal data analysis, for which message broker is used for communication. Various examples of message brokers include Apache Kafka, Azure Service bus, Rabbit MQ, etc.

Based on various requirements and the impact to the customers using products of the computing environment, some updates to existing services and applications may be rolled out or otherwise released in a staged (or canary) mode, such that the updates can be verified to few customers, and reviewed by them for further improvements and enhancements, before final release.

The systems and methods described herein may automate staged (or canary) deployment and enablement for applications, services and/or microservices (collectively referred to herein as "application services") via a deployment management service and application management service, which may perform message filtering via configuration of the application management service. A producer corresponding to the application may publish messages to a topic (or category) of a message broker. The configuration for the staged or canary deployment may be registered with, sent, or otherwise provided to the deployment management service. The deployment management service may deploy, establish, or otherwise configure an application management service for message filtering and routing to the appropriate version or release of the application. This messaging filtering may be performed by creating or establishing new topics (or categories) at the message broker, and establishing subscriptions for both the first and second release of the application services, and updating the configuration accordingly. As such, as messages corresponding to the application service are published to a category of message broker, the application management service may consume, ingest, or otherwise receive those messages, and publish those messages to new categories at the message broker for consumption by a respective release of the application service according to the message filtering settings.

According to the embodiments and aspects described herein, a producer may publish a message to the message broker on a first topic or category (e.g., categoryA). To enable a staged or canary deployment, the appropriate staging or canary configuration may be registered with the deployment management service, which may include details corresponding to the application service, the topic or category at the message broker corresponding to the application service, subscription information, staged or canary message filtering settings, etc. When the deployment management service receives the staging or canary configuration, the deployment management service may deploy, establish, provision, or otherwise configure an application management service, which filters messages consumed from the message broker based on the staging or canary configurations and requirements. The deployment management service may create new topics or categories at the message broker which correspond to categoryA (such as categoryA (1), categoryA (2)), along with the subscribers (subscriberA (1), subscriberA (2)) for message processing or consumption by the first and second release of the application service. The first and second release of the application services consume messages from categoryA (1), categoryA (2). As such, the application services receive their respective messages without any need to focus on filtering logic, as the staged or canary deployment and message filtering is automated.

According to such embodiments, the arrangements described herein may provide the capability to scale individual application services as per needs. Additionally, message filtering may be configuration driven and isolated from the deployment or filtering logic, which enables application service developers to focus more on development of application services as opposed to their development configurations. Additionally, since the message processing and filtering is performed by the application management service, the application services may not have additional overhead for message filtering. The arrangements described herein may be applicable to application services written in any technical stack, as the proposed arrangements may be language agnostic and may not require any code changes in the application/service/microservice (or other application service) being deployed. The application management service may be stateless and lightweight. The proposed approach may be capable or configured to support list-based filtering, and may also leverage other filtering mechanisms (such as percentage-based identifiers by calculating a consistent hash that maps the application identifier as per the configuration).

According to the embodiments described herein, the systems and methods may provide an automatic canary deployment (or other managed deployment) and support, to enable a managed deployment for message broker-based streaming applications, services, microservices, or other application services of the computing environment. The systems and methods described herein may be generic or agnostic for any message broker provider, such as Apache Kafka, Azure Service bus, Rabbit MQ, etc. The systems and methods described herein may be independent and technology stack agnostic, and may be a solution to application services written in any technologies, such as JAVA, SCALA, NODE-JS, etc. Developers may focus on business logic for updated version of application services rather than spending efforts to develop and deploy both application services in a staged or canary mode. The staged deployment may be configured and automated without message loss. Thus, the proposed systems and methods ensure that both first and second releases of application services focus on actual logic and are detached from the filtering of messages, as such filtering may be automatically configured.

In one aspect, the present disclosure is directed to a method. The method may include receiving, by a deployment management service executing in a computing environment having a first release of an application service for the computing environment, one or more settings for a second release of the application service. The method may include configuring, by the deployment management service, an application management service in the computing environment with the one or more settings. The method may include transmitting, by the deployment management service, to a message broker, a request to cause the application management service to receive messages published to a first category of the message broker. The method may include receiving, by the application management service from the message broker, a message corresponding to the application. The method may include identifying, by the application management service based on the message and the one or more settings, a second category of the message broker corresponding to one of the first release or the second release, to which the application management service is to publish the message. The method may include publishing, by the application service, the message to the second category of the message broker for consumption by one of the first release or the second release of the application service.

In some embodiments, the method further includes transmitting, by the deployment management service, the one or more settings for the second release of the application service to the application management service, to cause the application management service to control publishing of messages according to the one or more settings. In some embodiments, the method further includes establishing, by the deployment management service, the second category at the message broker corresponding to one of the first release or the second release of the application service, and establishing, by the deployment management service, a third category at the message broker corresponding to the other one of the first release or the second release of the application service. In some embodiments, the method further includes setting, by the deployment management service, the first release of the application service as a subscriber to the second category. The method may further include setting, by the deployment management service, the second release of the application service as a subscriber to the third category. Messages published by the application management service to the second category may be consumed by the first release of the application service and messages published by the application management service to the third category may be consumed by the second release of the application service. In some embodiments, the message is a first message. The method may further include receiving, by the application management service from the message broker, a second message corresponding to the application service. The method may further include identifying, by the application management service based on the second message and the one or more settings, the third category of the message broker corresponding to the other one of the first release or the second release, to which the application management service is to publish the message. The method may further include publishing, by the application service, the second message to the third category of the message broker for consumption by one or more subscribers of the other one of the first release or the second release.

In some embodiments, the method further includes receiving, by the deployment management service, one or more modified settings for publishing messages for consumption by the first release and the second release of the application service. The method may further include transmitting, by the deployment management service, the one or more modified settings to the application management service, to cause the application management service to control publishing of messages according to the one or more modified settings. In some embodiments, the method may include receiving, by the deployment management service, a request to disable the first release of the application service. The method may include transmitting, by the deployment management service, to the message broker, a request to cause the second release of the application service to receive messages published to the first category of the message broker. The method may include disabling, by the deployment management service, the application management service in the computing environment. In some embodiments, the method may include transmitting, by the deployment management service, to the message broker, a request to remove the second category at the message broker. In some embodiments, the one or more settings include one or more filtering settings in which requests are to be routed to the first release of the application service or the second release of the application service. In some embodiments, wherein the application service is streamed to the computing environment, and wherein the application service is at least one of an application, a service, or a microservice.

In another aspect, the present disclosure is directed to a system. The system may include a deployment management service executing in a computing environment having a first release of an application service for the computing environment. The deployment management service may be configured to receive one or more settings for a second release of the application service. The deployment management service may be configured to configure an application management service in the computing environment with the one or more settings. The deployment management service may be configured to transmit, to a message broker, a request to cause the application management service to receive messages published to a first category of the message broker. The application management service may be configured to receive, from the message broker, a message corresponding to the application. The application management service may be configured to identify, based on the message and the one or more settings, a second category of the message broker corresponding to one of the first release or the second release, to which the application management service is to publish the message. The application management service may be configured to publish the message to the second category of the message broker for consumption by one of the first release or the second release of the application service.

In some embodiments the deployment management service is further configured to transmit the one or more settings for the second release of the application service to the application management service, to cause the application management service to control publishing of messages according to the one or more settings. In some embodiments, the deployment management service is further configured to establish the second category at the message broker corresponding to one of the first release or the second release of the application service, and establish a third category at the message broker corresponding to the other one of the first release or the second release of the application service. In some embodiments, the deployment management service is further configured to set the first release of the application service as a subscriber to the second category, and set the second release of the application service as a subscriber to the third category. Messages published by the application management service to the second category may be consumed by the first release of the application service and messages published by the application management service to the third category may be consumed by the second release of the application service. In some embodiments, the message is a first message. The application management service may be further configured to receive, from the message broker, a second message corresponding to the application service. The application management service may be further configured to identify, based on the second message and the one or more settings, the third category of the message broker corresponding to the other one of the first release or the second release, to which the application management service is to publish the message. The application management service may be further configured to publish the second message to the third category of the message broker for consumption by one or more subscribers of the other one of the first release or the second release.

In some embodiments, the deployment management service is further configured to receive one or more modified settings for publishing messages for consumption by the first release and the second release of the application service. The deployment management service may be configured to transmit the one or more modified settings to the application management service, to cause the application management service to control publishing of messages according to the one or more modified settings. In some embodiments, the deployment management service is further configured to receive a request to disable the first release of the application service, transmit, to the message broker, a request to cause the second release of the application service to receive messages published to the first category of the message broker, and disable the application management service in the computing environment. In some embodiments, the deployment management service is further configured to transmit, to the message broker, a request to remove the second category at the message broker. In some embodiments, wherein the application service is streamed to the computing environment, and wherein the application service is at least one of an application, a service, or a microservice.

In another aspect, the present disclosure is directed to a system. The system includes an application management service executing in a computing environment responsive to enablement by a deployment management service. The computing environment may include a first release of an application service for the computing environment. The application management service may be configured with one or more settings for a second release of the application service. The application management service may be configured to receive, from a message broker via an address corresponding to the application management service, a message corresponding to the application service. The application management service may be configured to identify, based on the message and the one or more settings, a category of the message broker corresponding to one of the first release or the second release, to which the application management service is to publish the message. The application management service may be configured to publish the message to the category of the message broker for consumption by one of the first release or the second release of the application service.

BRIEF DESCRIPTION OF THE FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for managing releases of application services in a computing environment.

A. Network and Computing Environment

Figure 1A:
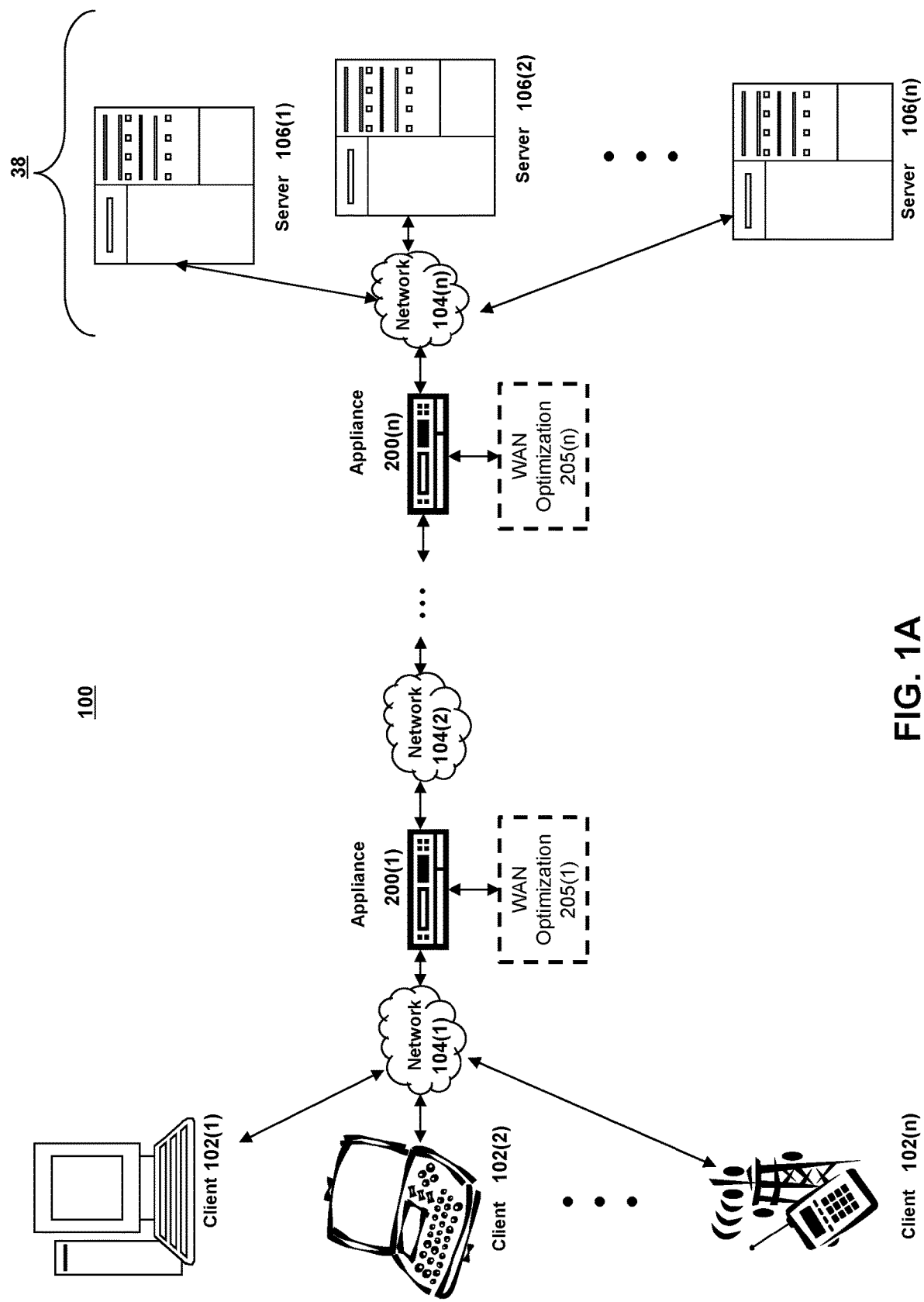
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106.

In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
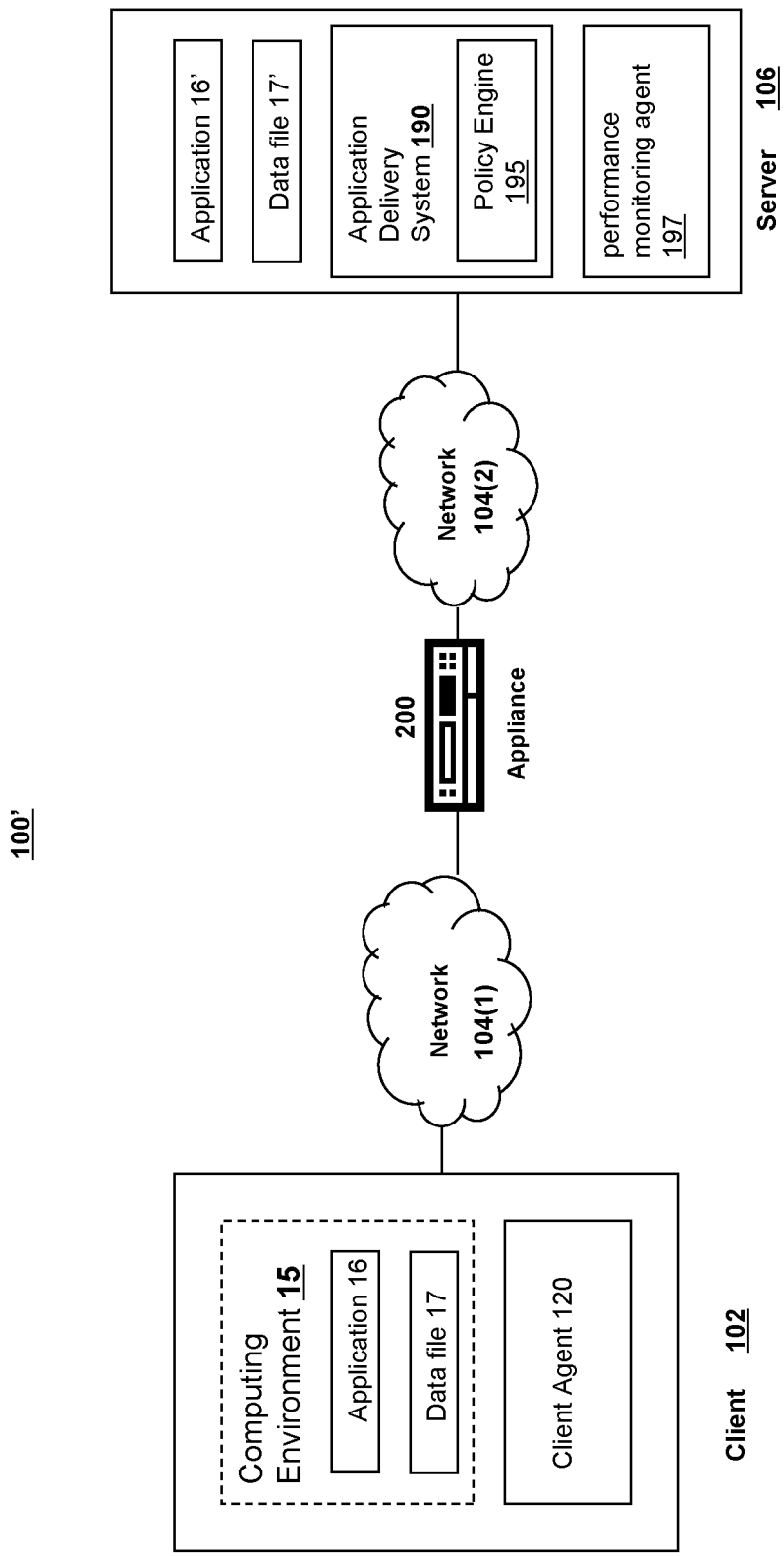
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
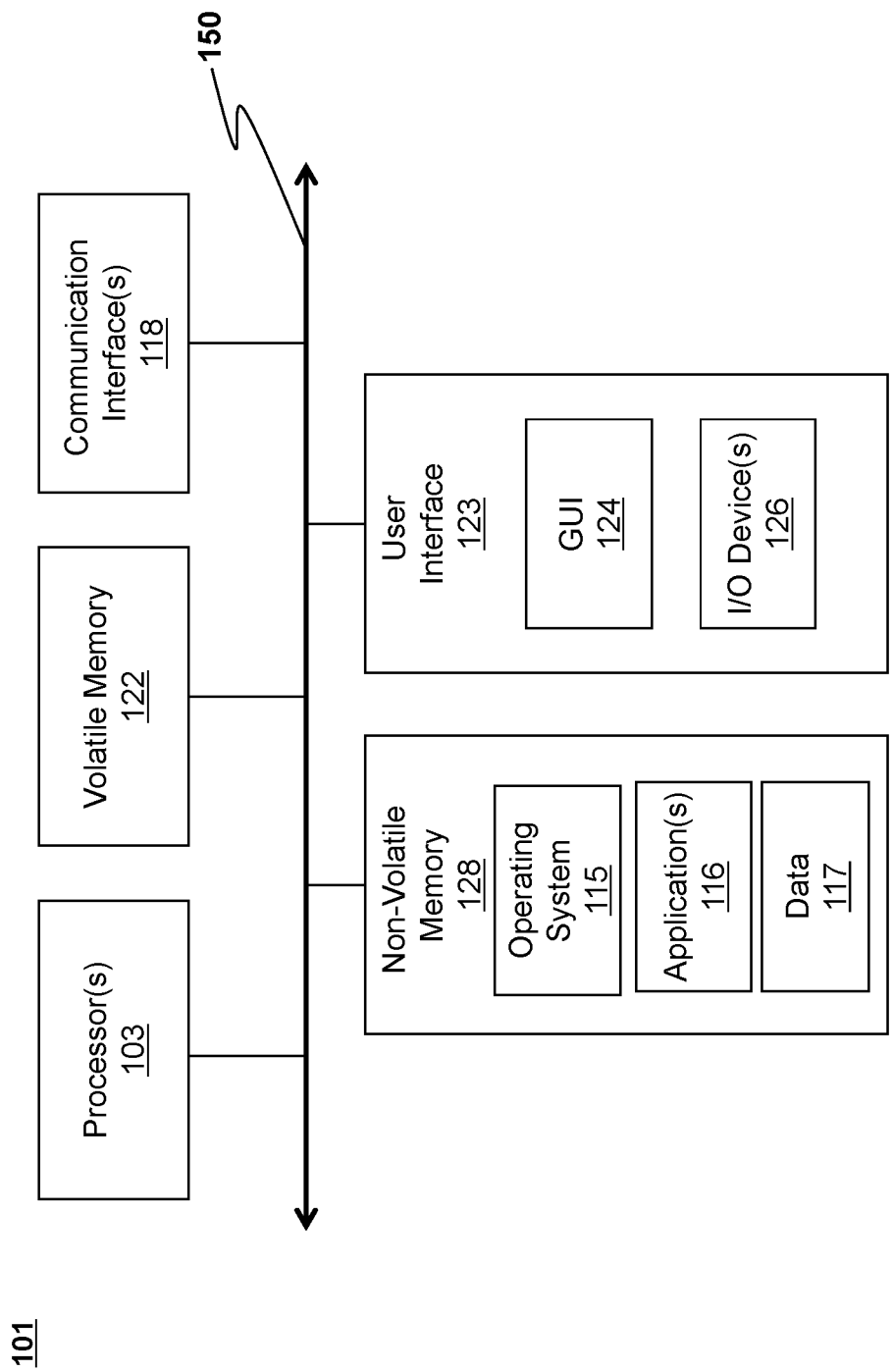
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
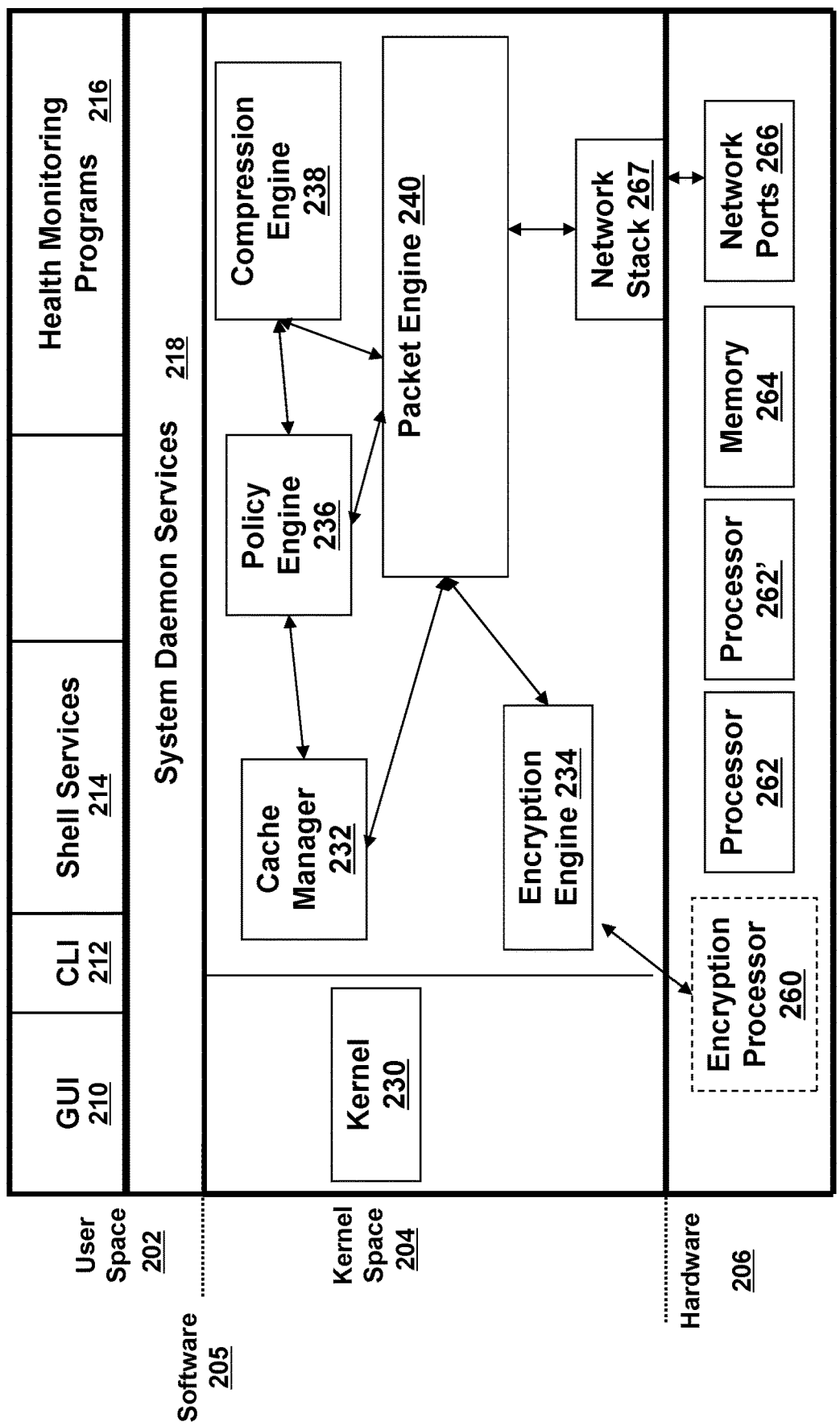
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
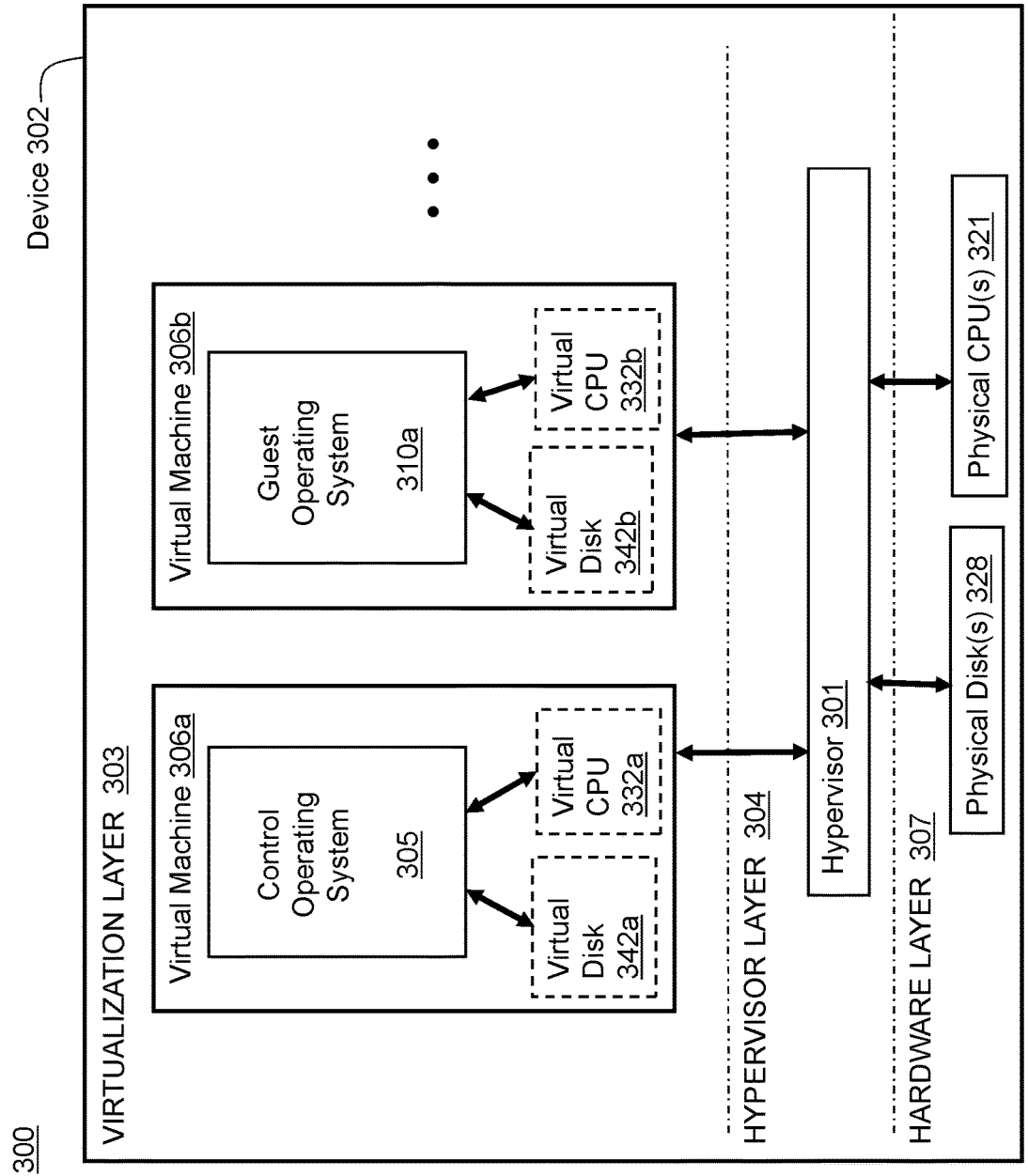
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
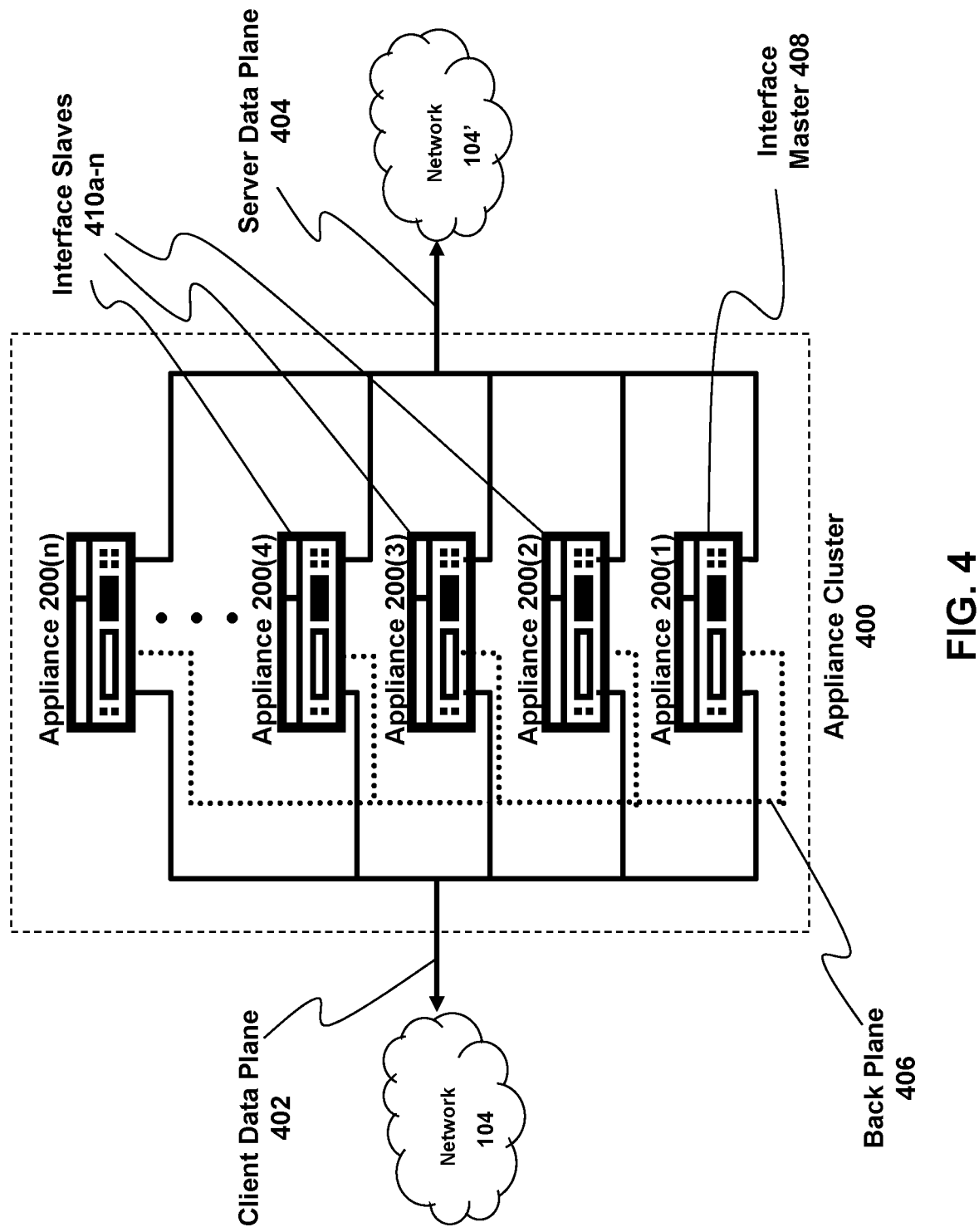
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Managing Releases of Application Services in a Computing Environment The embodiments described herein are directed to systems and methods for managing releases of application services in a computing environment. An analytics or cloud service (such as Citrix Analytics Service) may provide analytical insights of data across various services and products (both internal and external integrated products) within the computing environment. The analytics service may gather data from various sources of the computing environment and builds reports, dashboards, etc. to provide insights to customers and administrators. The data may be processed and analyzed to develop, provision, or otherwise provide analytical solutions to the customers. The data may include information on entities, such as users, devices, network, and shares, etc. along with their correlation, over a period from various products. This data may be analyzed by machine learning models, user defined/custom models defined by administrators and streaming models to detect threats/risks associated with the entities. These models may process the data in real-time (or near real-time) so that preventive measures like actions are taken on the end-user to mitigate threats. The data ingested, received, or otherwise analyzed by the analytics service may be stored in various data stores like SQL, Druid, Graph, Hive etc. based on its nature and usability.

As most of the processing within the computing environment is asynchronous across the models built, components developed and other advanced services of the computing environment, the mode of communication between these streaming applications, services, microservices, and/or other application services is through message brokers. As such, there typically is no end-user interaction for most of the internal data analysis, for which message broker is used for communication. Various examples of message brokers include Apache Kafka, Azure Service bus, Rabbit MQ, etc.

Based on various requirements and the impact to the customers using products of the computing environment, some updates to existing services, microservices, applications, and/or other application services may be rolled out or otherwise released in a staged (or canary) mode, such that the updates can be verified to few customers, and reviewed by them for further improvements and enhancements, before final release.

The systems and methods described herein may automate staged (or canary) deployment and enablement for applications, services, microservices and/or other application services via a deployment management service and application management service, which may perform message filtering via configuration of the application management service. A producer corresponding to the application service may publish messages to a topic (or category) of a message broker. The configuration for the staged or canary deployment may be registered with, sent, or otherwise provided to the deployment management service. The deployment management service may deploy, establish, or otherwise configure an application management service for message filtering and routing to the appropriate version or release of the application service. This messaging filtering may be performed by creating or establishing new topics (or categories) at the message broker, and establishing subscriptions for both the first and second release of the application services, and updating the configuration accordingly. As such, as messages corresponding to the application service are published to a category of message broker, the application management service may consume, ingest, or otherwise receive those messages, and publish those messages to new categories at the message broker for consumption by a respective release of the application services according to the message filtering settings.

According to the embodiments and aspects described herein, a producer may publish a message to the message broker on a first topic or category (e.g., categoryA). To enable a staged or canary deployment, the appropriate staging or canary configuration may be registered with the deployment management service, which may include details corresponding to the application service, the topic or category at the message broker corresponding to the application service, subscription information, staged or canary message filtering settings, etc. When the deployment management service receives the staging or canary configuration, the deployment management service may deploy, establish, provision, or otherwise configure an application management service, which filters messages consumed from the message broker based on the staging or canary configurations and requirements. The deployment management service may create new topics or categories at the message broker which correspond to categoryA (such as categoryA (1), categoryA (2)), along with the subscribers (subscriberA (1), subscriberA (2)) for message processing or consumption by the first and second release of the application service. The first and second release of the application service consume messages from categoryA (1), categoryA (2). As such, the application receive their respective messages without any need to focus on filtering logic, as the staged or canary deployment and message filtering is automated.

According to such embodiments, the arrangements described herein may provide the capability to scale individual application services as per needs. Additionally, message filtering may be configuration driven and isolated from the deployment or filtering logic, which enables application developers to focus more on development of application services as opposed to their development configurations.

Additionally, since the message processing and filtering is performed by the application management service, the application services may not have additional overhead for message filtering. The arrangements described herein may be applicable to application services written in any technical stack, as the proposed arrangements may be language agnostic and may not require any code changes in the application/service/microservice (or other application service) being deployed. The application management service may be stateless and lightweight. The proposed approach may be capable or configured to support list-based filtering, and may also leverage other filtering mechanisms (such as percentage-based identifiers by calculating a consistent hash that maps the application identifier as per the configuration).

According to the embodiments described herein, the systems and methods may provide an automatic canary deployment (or other managed deployment) and support, to enable a managed deployment for message broker-based streaming applications, services, microservices, and/or other application services of the computing environment. The systems and methods described herein may be generic or agnostic for any message broker provider, such as Apache Kafka, Azure Service bus, Rabbit MQ, etc. The systems and methods described herein may be independent and technology stack agnostic, and may be a solution to application services written in any technologies, such as JAVA, SCALA, NODE-JS, etc. Developers may focus on business logic for updated version of application services rather than spending efforts to develop and deploy both application services in a staged or canary mode. The staged deployment may be configured and automated without message loss. Thus, the proposed systems and methods ensure that both first and second releases of application services focus on actual logic and are detached from the filtering of messages, as such filtering may be automatically configured.

Figure 5:
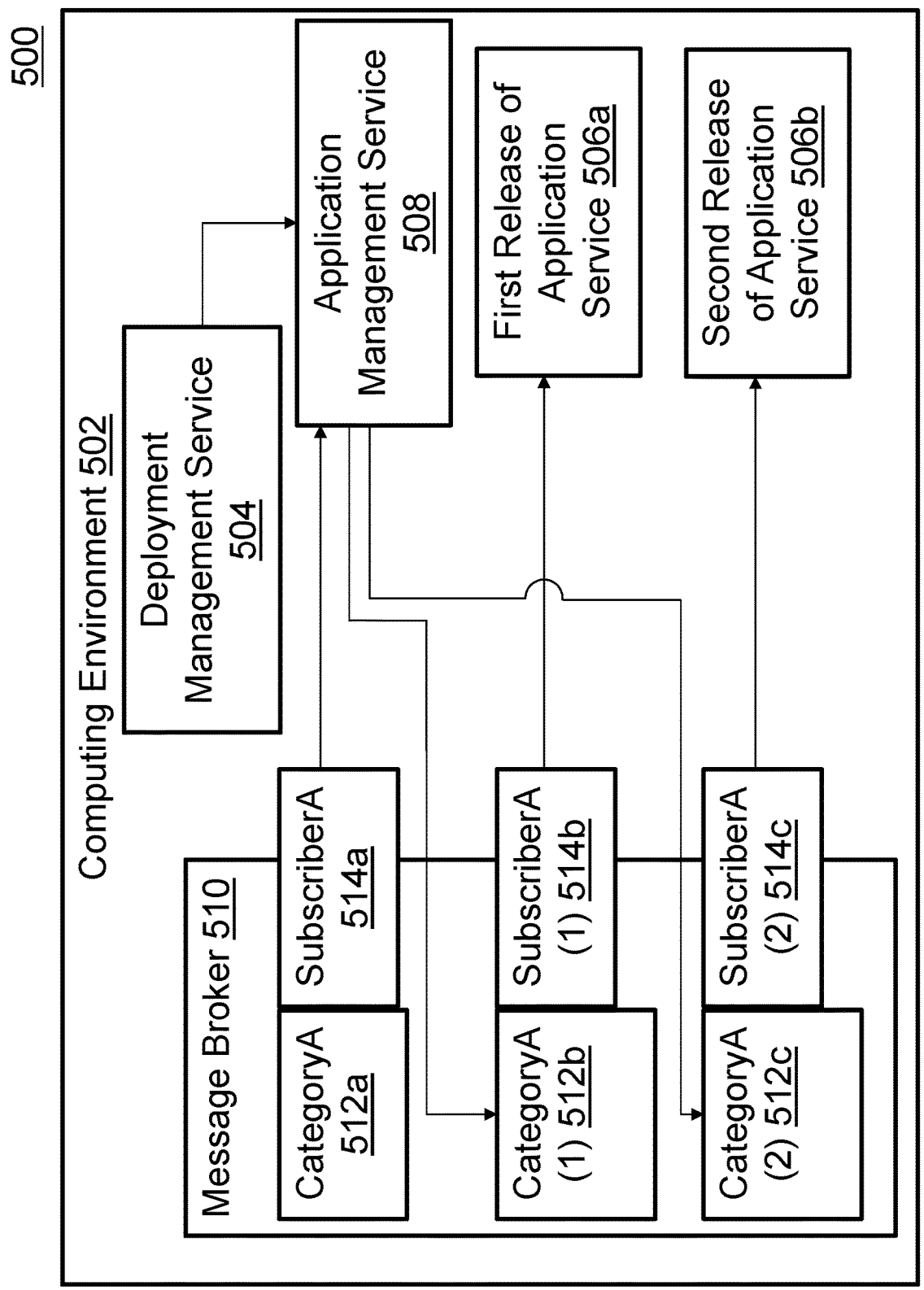
FIG. 5 is a block diagram of one embodiment of a system for managing releases of application services.

Referring to FIG. 5, depicted is a block diagram of one embodiment of a system 500 for managing releases of application services in a controlled manner. The system 500 is shown to include a computing environment 502. The computing environment 502 includes a deployment management service 504 which manages rollout of various releases of application services 506 of the computing environment 500. The computing environment 502 may be similar in some respects to the computing environment described above in Section A. The application services 506 may be established, provisioned, or otherwise provided by an application provider or developer. Where the application service provider or developer develops a new version or release of the application service 506, the deployment management service 504 may be configured to receive an indication or data corresponding to the new version or release of the application service 506. The deployment management service 504 may be configured to control, regulate, or otherwise manage rollout of the application services 506.

As described in greater detail below, the computing environment 502 may have a first release of an application service 506a. The deployment management service 504 which executes in the computing environment 502 may receive one or more settings for a second release of the application service 506b. The deployment management service 504 may configure an application management service 508 in the computing environment 502 with the one or more settings. The deployment management service 504 may transmit a request to a message broker 510. The request may be a request to cause the application management service 508 to receive messages published to a first category 512a of the message broker 510. The application management service 508 may receive a message corresponding to the application service 506. The application management service 508 may identify a second category 512b, 512c of the message broker 510 corresponding to one of the first release or the second release 506a, 506b to which the application management service 508 is to publish the message based on the message and the one or more settings. The application management service 508 may publish the message to the second category 512b, 512c for consumption by one or more subscribers 514b, 514c of the first release or second release 506a, 506b.

Each of the above-mentioned elements or entities is implemented in hardware, or a combination of hardware and software, in one or more embodiments. Each component of the system 500 may be implemented using hardware or a combination of hardware or software detailed above in connection with FIG. 1A-FIG. 1C. For instance, each of these elements or entities can include any application, program, library, script, task, service, process or any type and form of executable instructions executing on hardware of the system 500 for example. The hardware includes circuitry such as one or more processors in one or more embodiments.

The system 500 may be or include one or more server(s), computer(s), computing system(s), etc. configured to distribute, disburse, or otherwise provide the computing environment 502. The system 500 may include one or more of the computing components described above with reference to FIG. 1A-FIG. 1C (e.g., one or more processor(s) 103, volatile or non-volatile memory 122, 128, communications interface(s) 118). Hence, the system 500 may include aspects similar to the computer 101 described above. In some implementations, separate server(s), computer(s), computing system(s), etc. may provide or provision different aspects of the computing environment 502. For example, the message broker 510 may be provided, provisioned, or otherwise executing on a first server, and the deployment management service 504 and application management service 508 may be provided, provisioned, or otherwise executing on a second server. Similarly, the application services 506 may be provided or provisioned by an application provider or publisher and execute on a third server. In some embodiments, the deployment management service 504 and application management service 508 may be provided, provisioned, or otherwise execute on separate servers. The deployment management service 504, application services 506, application management service 508 and message broker 510 may together define the computing environment 502.

The system 500 is shown to include a deployment management service 504. The deployment management service 504 may be or include any device, component, script, or combination of hardware and/or software designed or implemented to receive one or more settings corresponding to releases of various application services 506 of the computing environment 502. In some embodiments, the deployment management service 504 may be configured to receive settings data from an application developer computing device or system associated with the application services 506. For example, the deployment management service 504 may be configured to receive settings data responsive to a new rollout of an application service 506 in the computing environment 502, responsive to rollout of a new version of an application service 506, responsive to a rollback to a previous version of an application service 506, and so forth.

The system 500 is shown to include one or more application services 506. The application services 506 may be or include background services executing in a computing environment 502 which is universal to all clients executing the computing environment 502. In some embodiments, the application services 506 may be designed or configured to do timed work. For instance, the application services 506 may generate reports every hour, may read a queue and perform a task based on the item in the queue, etc. The application services 506 may execute in the background. Hence, the application services 506 may have limited to no customer interaction. In some embodiments, the application services 506 may be or include other applications, services, or microservices which may process, perform, or otherwise execute various tasks within the computing environment 502. As such, the application services 506 may be or include any application, service, or microservice of the computing environment 502. In some embodiments, the application services 506 may be implemented within the computing environment 502. In some embodiments, the application services 506 may be streamed to the computing environment 502 (e.g., from a remote source or server). As described in greater detail below, the application services 506 may be configured to consume messages or data from the message broker 510. The application services 506 may be configured to subscribe to a category 512 at the message broker 510 to receive messages or data from the message broker 510. The application services 506 may be configured to process or otherwise consume the messages from the message broker 510.

The system 500 is shown to include an application management service 508. The application management service 508 may be or include any device, component, script, or combination of hardware and/or software designed or implemented to perform filtering or routing of messages published to a first category 512 of the message broker 510 to one or more other categories 512 of the message broker 510. The application management service 508 may be established, generated, or otherwise configured by the deployment management service 504. For example, deployment management service 504 may configure the application management service 508 with the settings data received for the application services 506. As such, the application management service 508 may be configured to perform filtering or routing of messages according to the settings data received by the deployment management service 504.

The system 500 is shown to include a message broker 510. The message broker may be or include any device, component, script, or combination of hardware and/or software designed or implemented to publish received messages to a category (or topic) 512. As shown in FIG. 5, the message broker 510 may include various categories 512 which include respective subscribers. The message broker 510 may be configured to publish messages received by the message broker 510 to a particular category 512 for consumption by corresponding subscribers 514.

In some embodiments, the deployment management service 504 may be configured to transmit requests to update data corresponding to the message broker 510. For example, the deployment management service 504 may be configured to transmit a request to the message broker 510 to generate new categories 512, to update subscribers 514 corresponding to existing and new categories 512, and so forth. The message broker 510 may be configured to generate and/or update the categories 512 and subscribers 514 according to the requests received from the deployment management service 504.

Figure 6A:
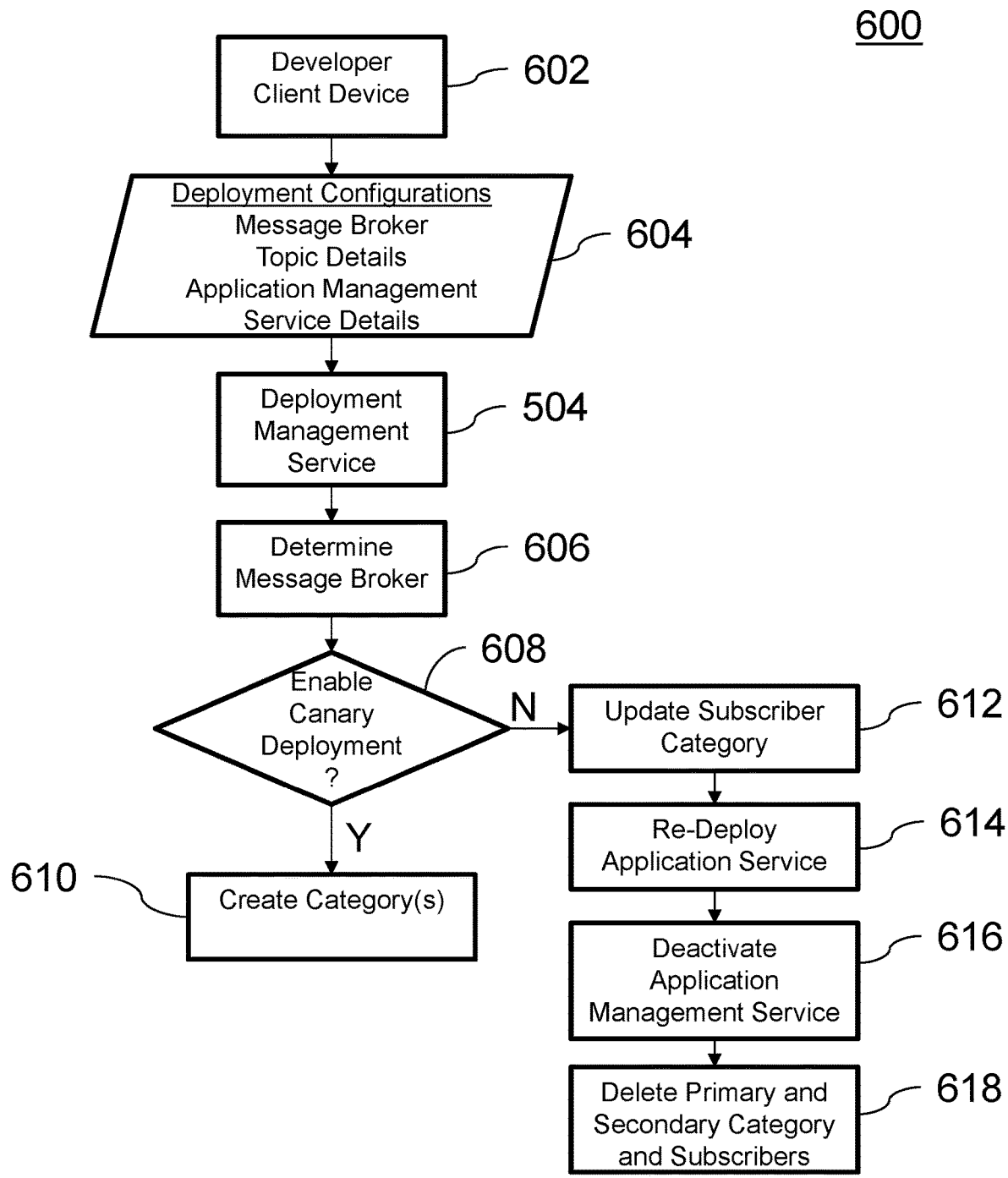
FIG. 6A and FIG. 6B show a flow diagram of one example embodiment of a method of configuring an application management service of the system of FIG. 5.
Figure 6B:
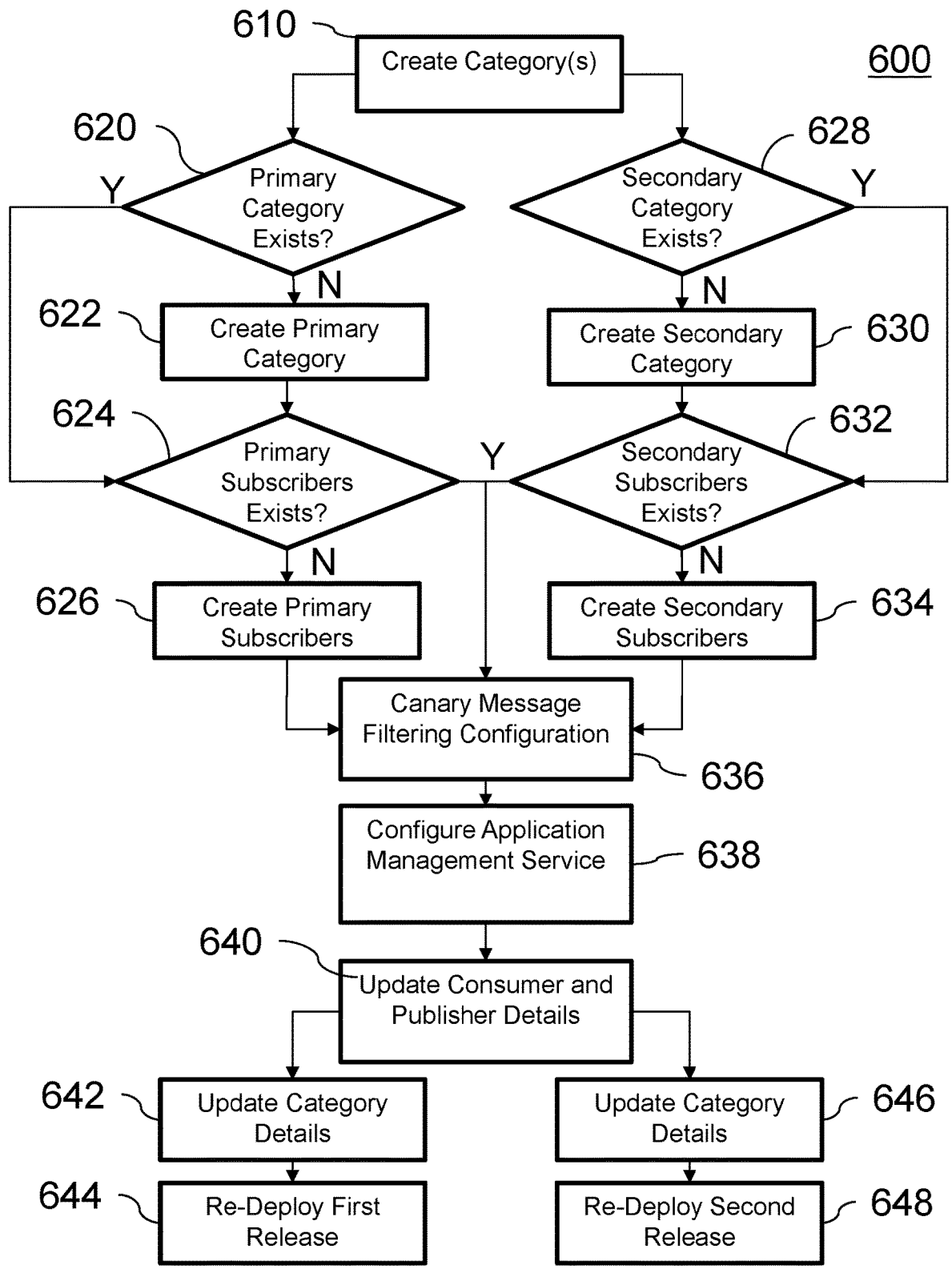

Referring now to FIG. 5-FIG. 6B, the deployment management service 504 may the application management service 508 based on a new release of an application service 506. Specifically, FIG. 6A-FIG. 6B is a flow diagram showing a method 600 of configuring the application management service 508, according to an illustrative embodiment.

At step 602 through step 606, a developer client device (or system) 602 of an application service 506 determines, establishes, generates, or otherwise provides development configurations 604 for a new version or release of the application service 506b. In some embodiments, the developer use, operate, or otherwise control the developer client device 602 to provide the development configurations 604 responsive to generating one or more updates to a first release of the application service 506a. In some embodiments, the developer may provide the development configurations 604 from a developer computing device 602 to the deployment management service. The development configurations 604 may include an identifier or address corresponding to a message broker 510 which publishes messages corresponding to the application service 506, an address corresponding to a category 512 in which the application service 506 is a subscriber 514, settings corresponding to routing or filtering of messages (e.g., routing settings) to be consumed by the application service 506, and so forth. In some embodiments, the development configurations 604 may be structured by the developer client device 604 as a string of data with particular bits or bytes corresponding to the respective development configurations 604 (e.g., a string including a first set of bits for the identifier or address of the message broker 510, a second set of bits for the category 512, a third set of bits for the routing settings, and so forth). The developer client device 602 may be configured to transmit, send, or otherwise provide the development configurations 604 to the deployment management service 504 (e.g., to an address corresponding to the deployment management service 504).

The deployment management service 504 may be configured to receive the development configurations 604 for the application service 506 from the developer client device 602. At step 606, the deployment management service 504 may determine a message broker 510 corresponding to the application service 506. The deployment management service 504 may parse, inspect, or otherwise analyze the development configurations to determine or otherwise identify the message broker 510. For instance, and continuing the example above, where the development configurations 604 are structured as a string of data, the deployment management service 504 may parse the string to extract the bits (or bytes) corresponding to the message broker 510. The deployment management service 504 may be configured to perform a look-up function in a database, table, or other data structure to identify the corresponding message broker 510.

At step 608, the deployment management service 504 may determine whether the development configurations 604 include any instructions to enable or disable a canary (or staged) deployment. As noted above, the development configurations 604 may include routing settings. In some instances, the routing settings may include settings to re-route all messages from a first release of the application service 506a to a second release of the application service 506b. In other instances, the routing settings may include settings to route a portion of messages to the first release of the application service 506a and a portion of the messages to the second release of the application service 506b (or a canary deployment). The canary deployment settings may include settings for routing portions of messages to the releases of application services 506a, 506b according to a list-based filtering arrangement (such as particular messages or message types being routed to particular releases of the application service 506). In some embodiments, the canary deployment settings may include settings for routing portions of messages to the releases of application services 506a, 506b according to a percentage-based filtering arrangement (e.g., with a particular percentage of messages being routed to the first release of the application service 506a and the remaining messages being routed to the second release of the application service 506b). The canary deployment settings may be incorporated, embedded, or otherwise provided in the development configurations 604 as described above. Similar to identifying or determining the message broker at step 606, the deployment management service 504 may determine the canary deployment settings by parsing the development configurations 604 to identify bits or bytes corresponding to the canary deployment settings (e.g., a particular bit which indicates whether canary is to be enabled or disabled, and various bits or bytes which identify the canary deployment settings).

Where the development configurations 604 include a setting to disable a particular canary deployment, the method 600 may proceed to step 612, which is described in greater detail below. However, where the development configurations 604 include a setting to enable a canary deployment, the method 600 may proceed to step 610.

As shown in FIG. 6B, at step 610, the deployment management service 504 generates one or more categories 512 at the message broker 510 determined at step 606. The deployment management service 504 may cause the message broker 510 to generate categories 512 for each release of the application service 506.

In some implementations, such as prior to a rollout of a new release of an application service 506, the message broker 510 may include a first category 512a (shown in FIG. 5 to be CategoryA). In such implementations, the first release of the application service 506a may be a subscriber 514a to the first category 512a. When the second release of the application service 506b is rolled out, the deployment management service 504 may generate new categories 512b, 512c for the first and second release of the application service 506a, 506b. For example, the deployment management service 504 may cause the message broker 510 to generate a category 512b (shown in FIG. 5 to be CategoryA(1) and also referred to herein as a "primary category 512b") for the first release of the application service 506a. The deployment management service 504 may also cause the message broker 510 to generate a category 512c (shown in FIG. 5 to be CategoryA(2) and also referred to herein as a "secondary category 512c") for the second release of the application service 506b. As described in greater detail below, the deployment management service 504 may cause the message broker 510 to update an address corresponding to subscribers 514a of the first category 512a for the first release of the application service 506a to an address corresponding to the application management service 508. Messages published to the first category 512a may then be processed by the application management service 508, which publishes the messages to category 512b or category 512c for consumption by the respective release of the application service 506a, 506b.

At step 620, the deployment management service 504 determines whether a primary category 512b exists at the message broker 510. In some embodiments, the deployment management service 504 may determine whether the primary category 512b exists based on whether the deployment management service 504 has previously generated the primary category 512b at the message broker 510. In some embodiments, the deployment management service 504 may be configured to determine whether the primary category 512b exists by sending a request to the message broker 510 to produce or otherwise provide a list of categories 512 corresponding to the application service 506. The deployment management service 504 may parse, inspect, analyze, or otherwise process the list to determine whether the primary category 512b exists. Where the primary category 512b exists at the message broker 510, the method 600 may proceed to step 624. However, where the primary category 512b does not exist, the method 600 may proceed to step 622.

At step 622, the deployment management service 504 creates the primary category 512b. In some embodiments, the deployment management service 504 creates the primary category 512b at the message broker 510. The deployment management service 504 may create the primary category 512b by transmitting, sending, or otherwise issuing a request to the message broker 510 to generate the primary category 512b. The message broker 510 may be configured to receive the request from the deployment management service 504. The message broker 510 may generate a new category 512b based on the request. In some embodiments, the message broker 510 may transmit a confirmation message to the deployment management service 504 which confirms generation of the primary category 512b and data corresponding to the primary category 512b, such as an address for publishing messages to the primary category 512b.

At step 624, the deployment management service 504 determines whether any primary subscribers 514b exist for the primary category 512b. In some embodiments, where the deployment management service 504 determines at step 620 that the primary category 512b exists, the deployment management service 504 may determine whether there are any current subscribers 514b to the primary category 512b. In some embodiments, the deployment management service 504 may be configured to determine whether the primary category 512b has any subscribers 514b by sending a request to the message broker 510 to produce or otherwise provide a list of subscribers 514b to the primary category 512b. The deployment management service 504 may parse, inspect, analyze, or otherwise process the list to determine whether there are any subscribers 514b to the primary category 512b. Where at step 622, the deployment management service 504 creates a new category 512b, the primary category 512b may not have any subscribers 514b yet. If the primary category 512b does not have any subscribers 514b, the method 600 may proceed to step 626. However, if the primary category 512b has subscribers 514b, the method 600 may proceed to step 628.

At step 626, the deployment management service 504 may create one or more primary subscribers 514b for the primary category 512b. Each of the subscribers 514b may correspond to a particular application service 506 which is to consume messages published to the primary category 512b. As such, a particular category 512 (such as the primary category 512b) may have any number of subscribers 514b which subscribe to the category 512 channel at the message broker 510. As described in greater detail below with reference to FIG. 7, when messages are published to a particular category 512, the application services 506 which subscribe to the category 512 may consume the messages. The deployment management service 504 may be configured to create subscribers 514b for the primary category 512b by sending a request to create, establish, or otherwise provide subscribers 514b for the primary category 512b. For instance, the deployment management service 504 may send a request to the message broker 510 to request the first release of the application service 506a be a subscriber 514b for the primary category 512b. The message broker 510 may receive the request from the deployment management service 504, and create, establish, or otherwise provide the first release of the application service 506a as a subscriber 514b of the primary category 512b. As such, when messages are published to the primary category 512b, the messages may be consumed by the subscribers 514b (e.g., the first release of the application service 506a).

As shown in FIG. 6B, at step 628-step 634, the deployment management service 504 may determine whether the secondary category 512c (and secondary subscribers 514c) exist at the message broker 510. Steps 628-634 may be similar to steps 620-626 described above, but relate to the secondary category 512c (e.g., for the second release of the application service 506b).

Following steps 626 and 634, the method 600 may proceed to step 636. At step 636, the deployment management service 504 determines a canary message filtering configuration (e.g., canary deployment settings). As noted above with respect to step 608, the deployment management service 504 may be configured to identify canary deployment settings from the development configurations 604 received by the deployment management service 504 from the developer client device 602. The canary deployment may include settings for routing portions of messages to the releases of application services 506a, 506b according to a list-based filtering arrangement, a percentage-based filtering arrangement, etc. The deployment management service 504 may determine the canary deployment settings by parsing the development configurations 604 to identify bits or bytes corresponding to the canary deployment settings (e.g., a particular bit which indicates whether canary is to be enabled or disabled, and various bits or bytes which identify the canary deployment settings).

At step 638, the deployment management service 504 may generate, update, implement, or otherwise configure the application management service 508. In some embodiments, the deployment management service 504 may configure the application management service 508 with the canary deployment settings identified at step 636. As noted above, the application management service 508 may be configured to publish messages to various categories 512 at the message broker 510 for consumption by subscribers 514. The deployment management service 504 may configure the application management service 508 to perform message filtering and publishing according to the canary deployment settings.

In some embodiments, the deployment management service 504 may configure the application management service 508 by updating an address corresponding to the subscribers 514a of the first category 512a to an address corresponding to the application management service 508. As such, rather than the first release 506a being a subscriber 514a of the first category 512a, the application management service 508 may be the subscriber 514a of the first category 512a. When new messages are published to the first category 512a, the application management service 508 (rather than any release of the application service 506) may be configured to consume the message. Accordingly, the application management service 508 may be the sole subscriber 514a of the category 512a.

In some embodiments, the deployment management service 504 may configure the application management service 508 by transmitting, sending, or otherwise providing data for the canary deployment settings to the application management service 508. In some embodiments, the deployment management service 504 may transmit the canary deployment settings to the application management service 508 directly. In some embodiments, the deployment management service 504 may generate application management service settings according to or based on the canary deployment settings.

As noted above, the canary deployment settings may include settings for routing portions of messages to the releases of application services 506a, 506b according to a list-based filtering arrangement. The deployment management service 504 may generate application service settings which include settings corresponding to particular messages or message types published at the first category 512a. For example, the application management service settings may include settings for publishing one type of message to the primary category 512b for consumption by the first release of the application service 506a, and settings for publishing another type of message to the secondary category 512c for consumption by the second release of the application service 506b.

The canary deployment settings may include settings for routing portions of messages to the releases of application services 506a, 506b according to a percentage-based filtering arrangement. The deployment management service 504 may generate application management service settings which include settings corresponding to a particular percentage or ratio of messages which were published to the first category 512a to be published by the application management service 508 at the primary or secondary category 512b, 512c. For example, the application management service settings may include instructions or settings for the application management service 508 to compute or calculate a hash which maps an identifier for the application 50 computing or calculating a hash maps the application identifier for the application service 506 to a particular release 506a, 506b according to the percentage or ratio.

The deployment management service 504 may be configured to transmit, send, or otherwise provide the application management service settings to the application management service 508. The application management service 508 may receive the application management service settings from the deployment management service 504. The application management service 508 may implement, execute, or otherwise update the settings of the application management service 508 according to the application management service settings received from the deployment management service 504.

At step 640, the deployment management service 504 may update the consumer and publisher details for the application services 506. For example, the deployment management service 504 may update the consumer and publisher details for the first release and second release of the application service 506a, 506b.

At step 642, the deployment management service 504 updates the category 512b details corresponding to the first release of the application service 506a. In some embodiments, the deployment management service 504 may be configured to transmit a message, prompt, or trigger to the first release of the application service 506a which causes the application service 506a to update an address corresponding to the first category 512a to the primary category 512b. In some embodiments, the deployment management service 504 may be configured to transmit a message, prompt, or trigger to the developer client device 602 which includes an indicator, identifier, or address corresponding to the primary category 512b. The developer client device 602 may transmit, send, or otherwise provide the trigger (or a corresponding trigger) to the first release of the application service 506*a* which causes the application service 506*a* to update an address corresponding to the first category 512*a* to the primary category 512*b*. In these and other embodiments, the deployment management service 504 may cause the first release of the application service 506*a* to receive data corresponding to the primary category 512*b*.

At step 644, first release of the application service 506*a* is re-deployed with the updated category details. For example, the first release of the application service 506*a* may be configured as a subscriber 514*b* to the primary category 512*b*, rather than as a subscriber 514*a* to the first category 512*a*. As such, the first release of the application service 506*a* may consume messages published to the primary category 512*b*.

At steps 646 and 648, the deployment management service 504 may update category details for the second release of the application service 506*b*, and re-deploy the second release of the application service 506*b* with the updated category details. Accordingly, steps 646 and 648 may be similar to steps 642 and 644 described above, but for the second release of the application service 506*b*.

Following execution of steps 610-648, the deployment management service 504 may generate categories 512*b*, 512*c* for each release of the application service 506*a*, 506*b*, enable or otherwise configure the application management service 508 with the canary deployment settings, and re-deploy or otherwise cause the releases of the application service 506*a*, 506*b* to be subscribers 514*b*, 514*c* to the categories 512*b*, 512*c*. As described in greater detail below with respect to FIG. 7, a producer corresponding to the application service 506 may publish messages to the first category 512*a*. The application management service 508 may receive the messages published to the first category 512*a*, and publish the messages according to the canary deployment settings to the primary or secondary category 512*b*, 512*c* for consumption by the first release or second release of the application service 506*a*, 506*b*.

Returning to FIG. 6A, in some instances, such as following rollout and testing of a new release of an application service 506*b*, developer client device 602 may transmit updated development configurations to the deployment management service 504. Such updated development configurations may be or include updated canary deployment settings (such as a change in the percentage or ratio, a change in the list-based filtering, etc.). The deployment management service 504 may re-execute the method 600 to implement the updated canary deployment settings at the application management service 508. In some instances, the updated development configurations may include a request to disable the canary deployment. Where the deployment management service 504 determines the updated development configurations include a request to disable the canary deployment, the method 600 may proceed to step 612.

At step 612, the deployment management service 504 may update subscribers 514 corresponding to the first category 512*a*. The deployment management service 504 may update the subscribers 514 corresponding to the first category 512*a* by transmitting a request to the message broker 510 similar to the requests sent at steps 626 and 634. The request may instruct the message broker 510 to update the subscribers 514 to be the first release or the second release of the application service 506*a*, 506*b*. For example, where the updated development configurations include a request to disable the canary deployment and deploy the first release of the application service 506*a*, the request may instruct the message broker 510 to update the subscribers 514*a* of the first category 512*a* to be the first release of the application service 506*a*. Similarly, where the updated development configurations include a request to disable the canary deployment and deploy the second release of the application service 506*b*, the request may instruct the message broker 510 to update the subscribers 514*a* of the first category 512*a* to be the second release of the application service 506*b*. The message broker 510 may receive the request from the deployment management service 504, and update the subscribers 514*a* of the first category 512*a* according to the request.

At step 614, the deployment management service 504 re-deploys the application service 506. Step 614 may be similar to steps 644 and 648 described above. The deployment management service 504 may re-deploy the application service 506 with the subscriber and consumer details according to the updated development configurations. For example, where the first release of the application service 506*a* is to be deployed, the deployment management service 504 may re-deploy the first release of the application service 506*a* with the first release 506*a* being a subscriber 514*a* of the first category 512*a*. Similarly, where the second release of the application service 506*b* is to be deployed, the deployment management service 504 may re-deploy the second release of the application service 506*b* with the second release 506*b* being a subscriber 514*a* of the first category 512*a*. In these and other embodiments, the deployment management service 504 may selectively cause a release of the application service 506*a*, 506*b* to be a subscriber 514*a* to the first category 512*a* (rather than a subscriber to the primary or secondary category 512*b*, 512*c*).

At step 616, the deployment management service 504 deactivates the application management service 508. In some embodiments, the deployment management service 504 deactivates the application management service 508 by sending, transmitting, or otherwise providing a deactivate setting to the application management service 508. The application management service 508 may be configured to switch to a sleep, disabled, inactive, or other deactivated mode or state responsive to receiving the deactivate setting from the deployment management service 504.

At step 618, the deployment management service 504 deletes the primary and secondary categories 512*b*, 512*c* and subscribers 514*b*, 514*c*. In some embodiments, the deployment management service 504 may delete the primary and secondary categories 512*b*, 512*c* and subscribers 514*b*, 514*c* by sending a request (similar to the requests sent at steps 622, 626, 630, 634) to the message broker 510. The request may include an identifier or address corresponding to the primary and secondary categories 512*b*, 512*c*, and an identifier corresponding to the subscribers 514*b*, 514*c*. The message broker 510 may be configured to delete the primary and secondary categories 512*b*, 512*c* and subscribers 514*b*, 514*c* responsive to receiving the request from the deployment management service 504.

Figure 7:
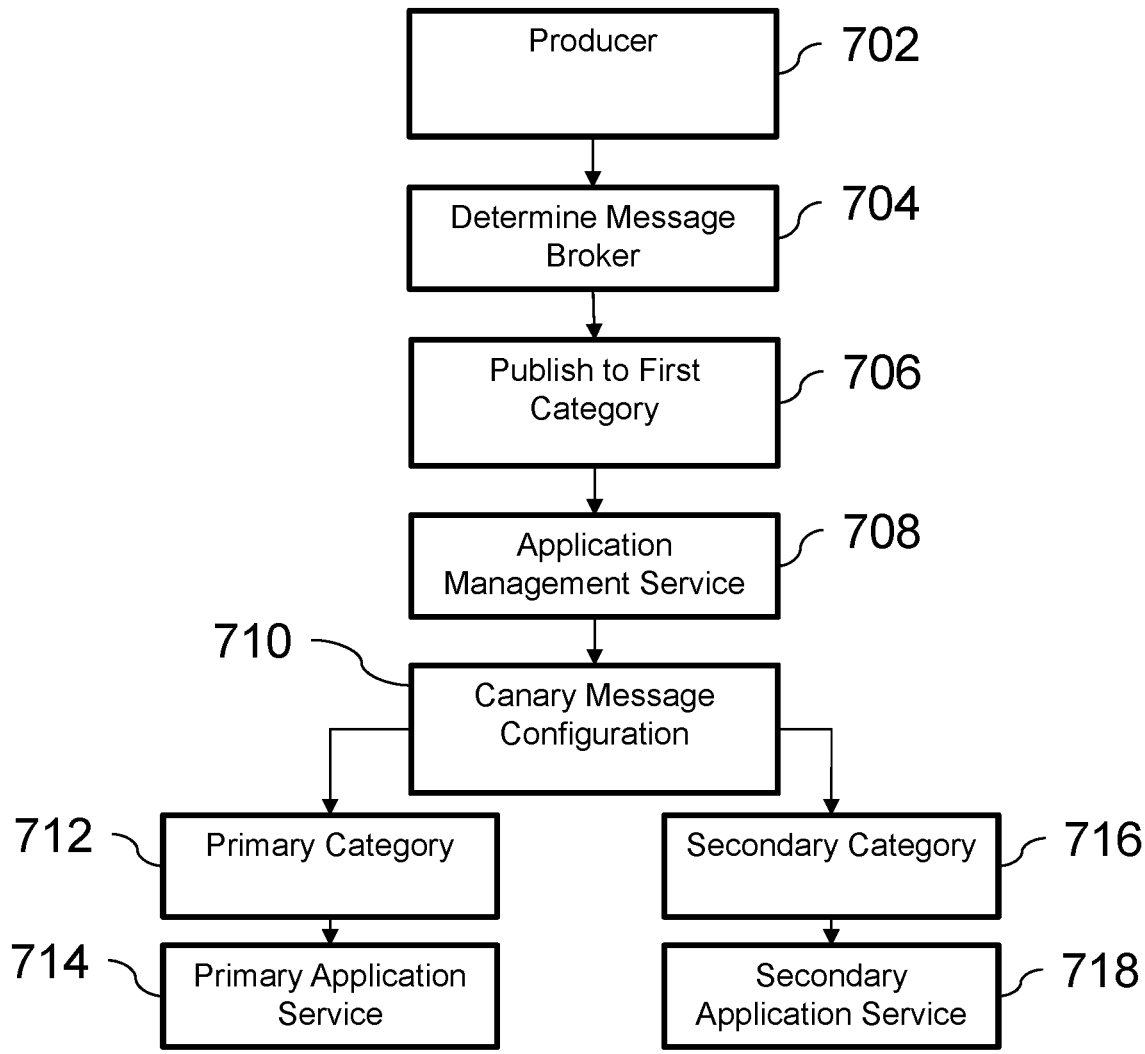
FIG. 7 is a flow diagram of one example embodiment of a method of routing messages.

Referring now to FIG. 5 and FIG. 7, the application management service 508 may be configured to process, filter, or otherwise route messages published to the first category 512*a* in a canary deployment. Specifically, FIG. 7 shows a flowchart showing a method 700 of routing messages, according to an illustrative embodiment.

At step 702, a producer may generate, produce, or otherwise provide one or more messages. The messages may be or include messages which are to be consumed by the application service 506. The producer may be another component or aspect of the computing environment 502 (such as another application or service within the computing environment 502). In some instances, the producer may be unaware of the first and second releases of the application service 506. Rather, the producer may be an application or service which performs a task or other function within the computing environment 502. The producer may publish messages to the first category 512*a* for consumption by various subscribers 514*a*. At step 704, the producer may determine or identify a message broker 510 for which to publish the message. In some embodiments, the producer may be configured to publish messages to a specific (or dedicated) message broker 510. In some embodiments, the producer may be configured to select a message broker 510 to which to publish messages based on the particular application service 506 which is to consume the message. In these and other embodiments, the producer may determine or otherwise identify the message broker 510 corresponding to the application service 506.

At step 706, the producer publishes the message to the first category 512*a*. In some embodiments, the producer may publish the message to the first category 512*a* by transmitting the message to the message broker 510 with instructions to publish the message to the first category 512*a*. In some embodiments, the producer may publish the message to the first category 512*a* directly (e.g., by transmitting the message to an address or channel for the first category 512*a*). The producer may publish the message to the first category 512*a* for consumption by subscribers 514*a* of the first category 512*a*. As noted above with respect to FIG. 6A-FIG. 6B, the application management service 508 may be the subscriber of the first category 512*a*.

At step 708, the application management service 508 may receive, ingest, consume, or otherwise process the message published to the first category 512*a*. Since the application management service 508 is a subscriber 514*a* of the first category 512*a*, the application management service 508 may receive each of the messages published to the first category 512*a*. As described in greater detail below, the application management service 508 may perform routing or filtering of messages published to the first category 512*a* according to the canary deployment settings.

At step 710, the application management service 508 may apply the canary deployment settings to the message published to the first category 512*a*. The application management service 508 may apply the canary deployment settings to the message to determine which release of the application service 506*a*, 506*b* is to consume the message. The application management service 508 may apply the list-based routing settings and/or percentage based routing settings to the message. In some embodiments, the application management service 508 may parse the message to determine a message type for the message (e.g., based on an identifier in a message header which identifies the message type, based on a structure of the message, etc.). The application management service 508 may determine whether the message is to be consumed by the first release or the second release of the application service 506*a*, 506*b* based on the determined message type and the canary deployment settings. In some embodiments, the application management service 508 may compute a hash for the message according to the percentage based routing settings to determine whether the message is to be consumed by the first release or the second release of the application service 506*a*, 506*b*. Where the application management service 508 determines that the message is to be consumed by the first release of the application service 506*a*, the method 700 may proceed to steps 712 and 714. On the other hand, where the application management service 508 determines that the message is to be consumed by the second release of the application service 506*b*, the method 700 may proceed to steps 716 and 718.

At 712, the application management service 508 publishes the message to the primary category 512*b*. The application management service 508 may publish the message to the primary category 512*b* by transmitting the message to the message broker 510 with instructions to publish the message to the primary category 512*b*. In some embodiments, the application management service 508 may publish the message to the primary category 512*b* directly (e.g., by transmitting the message to an address or channel for the primary category 512*b*).

At step 714, the first release of the application service 506*a* may process, ingest, or otherwise consume the message published to the primary category 512*b*. As noted above, the first release of the application service 506*a* may be a subscriber 514*b* of the primary category 512*b* (as opposed to the first category 512*a*). As such, when the application management service 508 publishes messages to the primary category 512*b*, the first release of the application service 506*a* may consume the message.

At step 716, the application management service 508 publishes the message to the secondary category 512*c*, and at step 718 the second release of the application service consumes the message. Steps 716 and 718 may be similar to steps 712 and 714 described above, but pertaining to the second release of the application service 506*b*.

According to the embodiments described herein, the deployment management service 504 and application management service 508 may together control the canary deployment of the first and second release of the application services 506*a*, 506*b*. As such, any filtering and routing of messages intended for the application service 506 generally is performed by the application management service 508 based on the configuration by the deployment management service 504.

Figure 8:
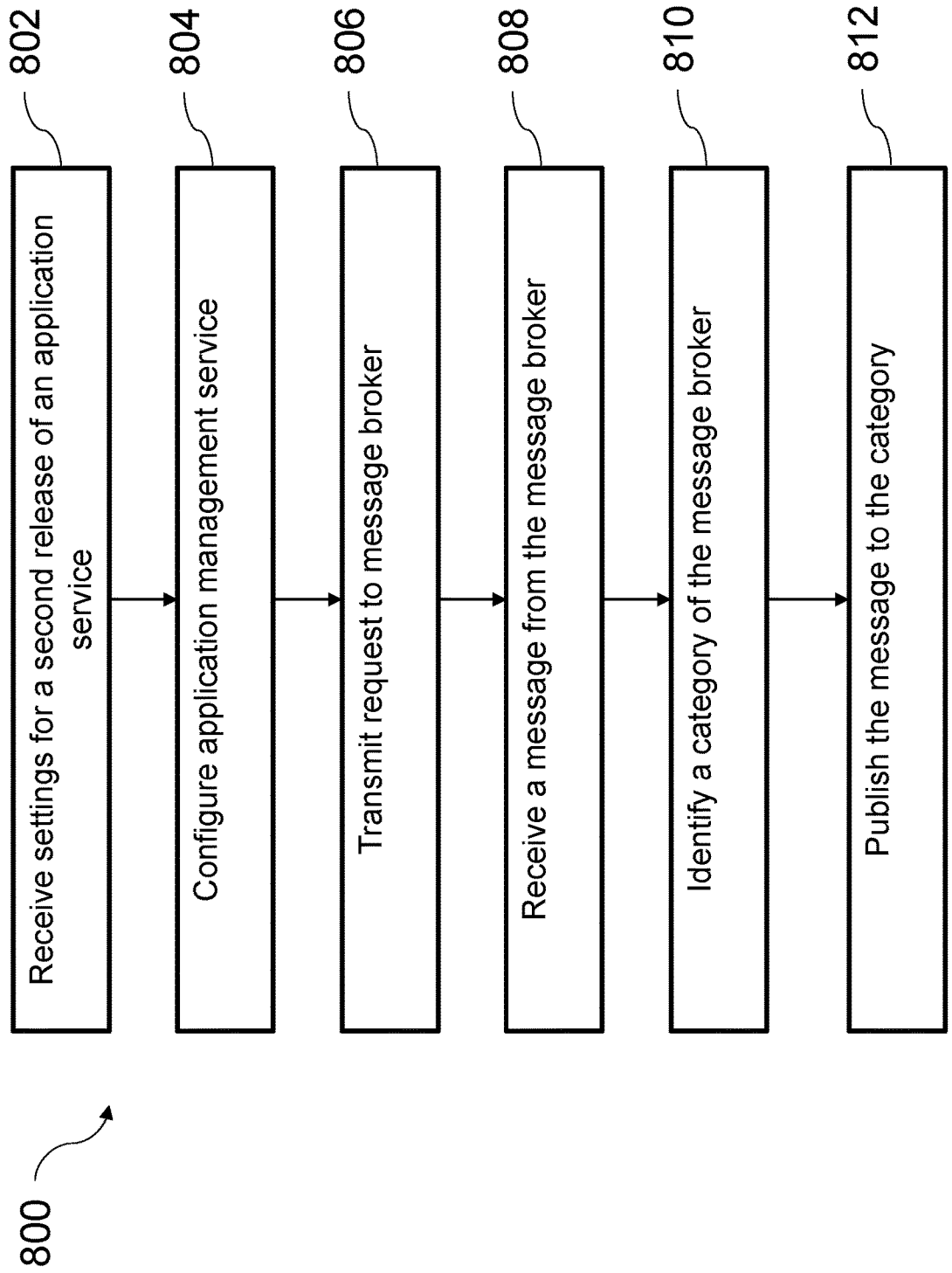
FIG. 8 is a flow diagram of one example embodiment of a method for managing releases of an application in a controlled manner.

Now that various aspects and related methods of the system 500 have been described, referring to FIG. 8, depicted a flow diagram of one example embodiment of a method 800 for managing releases of an application in a controlled manner. The functionalities of the method may be implemented using, or performed by, the components detailed herein in connection with FIGS. 1-7. In brief overview, a deployment management service may receive settings for a second release of an application service (802). The deployment management service may configure an application management service (804). The deployment management service may transmit a request to the message broker (806). The application management service may receive a message from the message broker (808). The application management service may identify a second category of the message broker (810). The application management service may publish the message to the second category (812).

At step (802), a deployment management service may receive settings for a second release of an application service. In some embodiments, the deployment management service may execute in a computing environment having a first release of an application service for the computing environment. In some embodiments, the deployment management service may receive the one or more settings for a second release of the application service responsive to the rollout of the second release in the computing environment. The deployment management service may receive the one or more settings from a developer client device. In some embodiments, the one or more settings may be or include canary deployment settings. For example, the canary deployment settings may be incorporated into development configurations from the developer client device, which may also include an identifier or data corresponding to the message broker, an identifier or data corresponding to a particular category (or categories) at the message broker, etc. As another example, the canary deployment settings may be sent separate from the development configurations. The canary deployment settings may include data for controlling routing of messages to the first and second release of the application service, as described in greater detail below.

At step (804), the deployment management service may configure an application management service. The application management service may be a component, element, or device in the computing environment. In some embodiments, the deployment management service may configure the application management service with the one or more settings received at step (802). In some embodiments, the deployment management service may enable the application management service in the computing environment. For example, the application management service may (prior to being configured) be in a disabled, inactive, or deactivated state. The deployment management service may send a request, command, or other data to the application management service, to activate the application management service. The deployment management service may transmit the settings to application management service for configuring the application management service. For example, the deployment management service may transmit the settings (received at step (802)) to the application management service to cause the application management service to update its settings. The application management service may receive the settings from the deployment management service. The application management service may apply the settings received from the deployment management service to control publishing of messages according to the one or more settings.

At step (806), the deployment management service may transmit a request to the message broker. In some embodiments, the deployment management service may transmit a request to the message broker which causes the application management service to receive messages published to a first category at the message broker. The deployment management service may transmit a request to the message broker to update subscribers of a first category (such as a category corresponding to the application service). The deployment management service may transmit the request to cause the application management service to set the application management service as the subscriber to the first category. In other words, the deployment management service may cause the application management service to be the subscriber of the first category corresponding to the application service. As such, when messages are published to the first category, the messages may be consumed, processed, identified, detected, or otherwise received by the application management service. The message broker may receive the request from the deployment management service. The message broker may update the subscribers to the first category to include the application management service. In some embodiments, the message broker may update the subscribers to the first category to be the application management service (e.g., remove existing subscribers and include the application management service as a subscriber).

In some embodiments, the deployment management service may establish a second category and a third category at the message broker. The second and third category may correspond to a respective release of the application service. For example, the second category may correspond to the first release and the third category may correspond to the second release (or vice versa). The deployment management service may establish the categories at the message broker by sending a request to the message broker which causes the message broker to generate, create, produce, or otherwise establish the categories. In some embodiments, the deployment management service may set subscribers to the second and third categories. For example, the deployment management service may set the first release of the application service as a subscriber to the second category and set the second release of the application service as a subscriber to the third category (or vice versa). The deployment management service may set the subscribers to the second and third categories by sending a request to the message broker for settings subscribers. The message broker may receive the request and set the subscribers based on the request. In some embodiments, the deployment management service may set subscribers to the second and third categories by updating settings at the first and second release of the application service. For example, the deployment management service may send an update or re-deploy request to the first and second release of the application service (or to the developer client device corresponding to the first and second release of the application service). The first and second release of the application service may be re-deployed or otherwise updated with the updated subscriber information. As such, when the application management service publishes messages to the second or third category, the first or second release of the application service may consume those corresponding messages.

At step (808), the application management service may receive a message from the message broker. In some embodiments, the application management service may receive a message from the message broker corresponding to the application. The application management service may receive the message published to the first category of the message broker. The message may be published to the first category by a producer (e.g., another application, script, or service within the computing environment). The application management service may receive the message responsive to the message being published to the first category. The application management service may retrieve the message responsive to a notification or flag indicating a new message has been published to the first category. For instance, the message broker may send a notification, flag, or alert to one, more than one, or all subscribers of a category when a new message is published to the category. In some embodiments, the application management service may receive the message responsive to the message being published to the first category. For example, the message broker may automatically transmit, send, or otherwise provide messages published to a category to the subscribers of the category. In these and other embodiments, the application management service may receive the messages published to the first category (since the application management service is a subscriber to the first category).

At step (810), the application management service may identify a category of the message broker. In some embodiments, the application management service may identify the category of the message broker based on the message and the one or more settings (e.g., which were used to configure the application management service at step (804)). In some embodiments, the application management service may identify the category from the second category and the third category. The application management service may identify the category to which the application management service is to publish the message. In some embodiments, the application management service may publish messages to the second and third category according to a list-based filtering arrangement or configuration based on the message type. As such, certain messages (having a particular message type) may be published to the second category for consumption by one release of the application service, and other messages (having a different message type) may be published to the third category for consumption by the other release of the application service. In some embodiments, the application management service may publish messages to the second and third category according to a percentage-based filtering arrangement or configuration. For example, the application management service may compute a hash for each message for determining which category the application management service is to publish the message. As such, a certain portion, percentage, or ratio of messages may be published to the second category for consumption by one release of the application service, and the remaining messages may be published to the third category for consumption by the other release of the application service.

At step (812), the application management service may publish the message to the category (e.g., identified at step (810)). In some embodiments, the application management service may publish the message to the identified category for consumption by subscribers of the corresponding category (e.g., one of the first release or the second release of the application service). The application management service may publish the message to the second category for consumption by subscribers of the second category (e.g., one of the first release or the second release of the application service). The application management service may publish the message to the third category for consumption by subscribers of the third category (e.g., the other one of the first release or the second release of the application service).

In some embodiments, the deployment management service may receive one or more modified settings for publishing messages for consumption by the first release and the second release of the application service. The modified settings may include a change in the percentage or ratio of messages published to the second or third category. The modified settings may include a change to the types of messages published to the second or third category. The deployment management service may transmit the modified settings to the application management service for implementation at the application management service. In other words, the deployment management service may re-configure the application management service to update the settings of the application management service. As such, the deployment management service may cause the application management service control publishing of messages according to the one or more modified settings.

In some embodiments, the deployment management service may receive a request to disable a particular release of the application service. For example, the deployment management service may receive a request to disable the first release of the application service (e.g., when the second release of the application service has passed one or more tests and is ready or suitable for full deployment). As another example, the deployment management service may receive a request to disable the second release of the application service (e.g., when the second release of the application service has failed one or more tests and the computing environment is being rolled back to the first release of the application service). The deployment management service may receive the request from the developer client device.

The deployment management service may transmit a request to the message broker to cause the second release of the application service (or first release of the application service) to receive messages published to the first category. The request may be similar to the request sent to the message broker at step 806. However, the request may cause the release to be deployed in the computing environment to be a subscriber of the first category (as opposed to the application management service). As such, messages published to the first category are received by the release of the application service rather than the application management service. The message broker may update the subscribers of the first category to be the release of the application service to be deployed in the computing environment. In some embodiments, the deployment management service may send an update or re-deploy request to the release of the application (or to the developer client device corresponding to the release of the application service). The release of the application service may be re-deployed or otherwise updated with the updated subscriber information (e.g., to subscribe the release of the application service to the first category).

In some embodiments, the deployment management service may disable the application management service in the computing environment. The deployment management service may disable the application management service by sending a request or setting to the application management service which causes the application management service to switch from an active to an inactive (or disabled, or deactivated) state. In some embodiments, the deployment management service may transmit a request to the message broker which causes the message broker to remove the second category (and the third category) at the message broker. The deployment management service may transmit the request to remove the categories at the message broker responsive to deactivating the application management service. The message broker may receive the request from the deployment management service and delete, deactivate, or otherwise remove the second (and third) category at the message broker. As such, messages published to the first category may be consumed by the release of the application service to be deployed in the computing environment, rather than being first processed or otherwise received by the application management service.

Now that various systems and methods of managing releases of application services has been described, the following description in conjunction with Table 1 below provides a use-case of managing releases of application services. In this example use-case, an application service ("OrderService") is to be deployed in a canary deployment. The deployment management service may enable a canary deployment for the OrderService application service. The OrderService application service may initially process messages from a Kafka message broker, which are published to category ("order-topic") and subscription name ("order-subscription"). The application management service may be enabled for tenants "tenant1, tenant2, tenant3." Based on the configuration received by deployment management service, an "OrderService" application management service is deployed with the specified message filtering logic to consume messages from "order-topic" and subscription "order-subscription". Topics "order-topic-primary" and "order-topic-canary" along with subscriptions "order-subscription-primary" and "order-subscription-canary" are created for OrderService and OrderService-Canary at the kafka message broker to consume messages from. The application services may be deployed (or re-deployed) following configuration updates. The deployment management service may generate a command (similar to the configuration command provided in Table 1, step 1) which is sent, transmitted, or otherwise provided to the application management service for configuring the application management service.

In some instances, the deployment management service may generate additional commands to update the configuration of the application management service. For example, the deployment management service may generate a command for the application management service to consume messages corresponding to additional tenants. The deployment management service may generate a new command (similar to the command shown in Table 1, step 2) for the application management service.

In some instances, the deployment management service may generate additional commands to disable a corresponding version of the OrderService application service. In the use-case described herein, the deployment management service may disable the canary version of the OrderService application service (e.g., OrderService-Canary). The deployment management service may generate a command (similar to the command shown in Table 1, step 3) for the application management service which updates the settings for the application management service. The deployment management service may subsequently disable the application management service, re-deploy the OrderService application service to consume messages published to the order-topic category (subscription "order-subscription"), and remove or otherwise delete the additional categories/subscribers at the Kafka message broker.

TABLE 1

Use Case of Managing Releases of Application Services

| Step No. | Examples | |
|---|---|---|
| 1. | Request | Enable canary for application service with name OrderService, processing messages from message broker Kafka published to category ("order-topic") and subscription name ("order-subscription"). The application management service is to be enabled for tenants "tenant1, tenant2, tenant3." |
| | Configuration | { <br> "serviceName": "OrderService", <br> "messageBroker": "Kafka", <br> "category": "order-topic", <br> "subscription": "order-subscription", <br> "enableCanary": true, <br> "canaryIdentifier": <br> [ <br> { <br> "type": "set", <br> "key": <br> [ <br> "$.tenant" <br> ], <br> "values": <br> [ <br> "tenant1", <br> "tenant2", <br> "tenant3" <br> ] <br> } <br> ] <br> } |
| | Procedure | Based on the configuration received by deployment management service, an "OrderService" application management service is deployed with the specified message filtering logic to consume messages from "order-topic" and subscription "order-subscription". Categories "order-topic-primary" and "order-topic-canary" along with subscriptions "order-subscription-primary" and "order-subscription-canary" are created for OrderService and OrderService-Canary at the kafka message broker to consume messages therefrom. The application services are (re-)deployed after configuration updates. |
| 2. | Request | Update canary configuration for application service "OrderService." The application management service is to process the messages for tenants "tenant1, tenant2, tenant3, tenant4" in the messages produced by a Producer (e.g., and published to the Kafka message broker). |
| | Configuration | { <br> "serviceName": "OrderService", <br> "messageBroker": "Kafka", <br> "category": "order-topic", <br> "subscriber": "order-subscription", <br> "enableCanary": true, <br> "canaryIdentifier": <br> [ <br> { <br> "type": "set", <br> "key": <br> [ <br> "$.tenant" <br> ], <br> "values": <br> [ <br> "tenant1", <br> "tenant2", <br> "tenant3", <br> "tenant4" <br> ] <br> } <br> ] <br> } |

TABLE 1-continued

Use Case of Managing Releases of Application Services

| Step No. | Examples | |
|---|---|---|
| | Procedure | Based on the update configuration received by deployment management service, the "OrderService" application management service is re-deployed with the updated message filtering logic. |
| 3. | Request Configuration | Disable canary for OrderService.<br>{<br>    "serviceName": "OrderService",<br>    "messageBroker": "Kafka",<br>    "category": "order-topic",<br>    "subscriber": "order-subscription",<br>    "enableCanary": false<br>} |
| | Procedure | Based on the configuration received by application management service for disabling the canary for OrderService, first the OrderService is updated to consume messages from "order-topic" and subscription "order-subscription". Then, the application management service, the order-topic-primary" and "order-topic-canary" are deleted from the resources. This bring the OrderService to the initial state. |

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method comprising:

receiving, by a deployment management service executing in a computing environment having a first release of an application service for the computing environment, one or more settings for a second release of the application service;

configuring, by the deployment management service, an application management service in the computing environment with the one or more settings;

transmitting, by the deployment management service, to a message broker, a request to cause the application management service to receive messages published to a first category of the message broker;

receiving, by the application management service from the message broker, a message corresponding to the application service;

identifying, by the application management service based on the message and the one or more settings, a second category of the message broker corresponding to one of the first release or the second release, to which the application management service is to publish the message; and publishing, by the application management service, the message to the second category of the message broker for consumption by one of the first release or the second release of the application service.

2. The method of claim 1, further comprising transmitting, by the deployment management service, the one or more settings for the second release of the application service to the application management service, to cause the application management service to control publishing of messages according to the one or more settings.

3. The method of claim 1, further comprising:
establishing, by the deployment management service, the second category at the message broker corresponding to one of the first release or the second release of the application service; and
establishing, by the deployment management service, a third category at the message broker corresponding to the other one of the first release or the second release of the application service.

4. The method of claim 3, further comprising:
setting, by the deployment management service, the first release of the application service as a subscriber to the second category; and
setting, by the deployment management service, the second release of the application service as a subscriber to the third category,
wherein messages published by the application management service to the second category are consumed by the first release of the application service and messages published by the application management service to the third category are consumed by the second release of the application service.

5. The method of claim 3, wherein the message is a first message, further comprising:
receiving, by the application management service from the message broker, a second message corresponding to the application service;
identifying, by the application management service based on the second message and the one or more settings, the third category of the message broker corresponding to the other one of the first release or the second release, to which the application management service is to publish the message; and
publishing, by the application service, the second message to the third category of the message broker for consumption by one or more subscribers of the other one of the first release or the second release.

6. The method of claim 1, further comprising:
receiving, by the deployment management service, one or more modified settings for publishing messages for consumption by the first release and the second release of the application service; and
transmitting, by the deployment management service, the one or more modified settings to the application management service, to cause the application management service to control publishing of messages according to the one or more modified settings.

7. The method of claim 1, further comprising:
receiving, by the deployment management service, a request to disable the first release of the application service;
transmitting, by the deployment management service, to the message broker, a request to cause the second release of the application service to receive messages published to the first category of the message broker; and
disabling, by the deployment management service, the application management service in the computing environment.

8. The method of claim 7, further comprising transmitting, by the deployment management service, to the message broker, a request to remove the second category at the message broker.

9. The method of claim 1, wherein the one or more settings comprise one or more filtering settings in which requests are to be routed to the first release of the application service or the second release of the application service.

10. The method of claim 1, wherein the application service is streamed to the computing environment, and wherein the application service is at least one of an application, a service, or a microservice.

11. A system comprising:
a deployment management service executing in a computing environment having a first release of an application service for the computing environment, the deployment management service configured to:
receive one or more settings for a second release of the application service;
configure an application management service in the computing environment with the one or more settings; and
transmit, to a message broker, a request to cause the application management service to receive messages published to a first category of the message broker; and
the application management service configured to:
receive, from the message broker, a message corresponding to the application service;
identify, based on the message and the one or more settings, a second category of the message broker corresponding to one of the first release or the second release, to which the application management service is to publish the message; and
publish the message to the second category of the message broker for consumption by one of the first release or the second release of the application service.

12. The system of claim 11, wherein the deployment management service is further configured to:
transmit the one or more settings for the second release of the application service to the application management service, to cause the application management service to control publishing of messages according to the one or more settings.

13. The system of claim 11, wherein the deployment management service is further configured to:
establish the second category at the message broker corresponding to one of the first release or the second release of the application service; and
establish a third category at the message broker corresponding to the other one of the first release or the second release of the application service.

14. The system of claim 13, wherein the deployment management service is further configured to:
set the first release of the application service as a subscriber to the second category; and
set the second release of the application service as a subscriber to the third category,
wherein messages published by the application management service to the second category are consumed by the first release of the application service and messages published by the application management service to the third category are consumed by the second release of the application service.

15. The system of claim 13, wherein the message is a first message, and wherein the application management service is further configured to:
receive, from the message broker, a second message corresponding to the application service;

identify, based on the second message and the one or more settings, the third category of the message broker corresponding to the other one of the first release or the second release, to which the application management service is to publish the message; and publish the second message to the third category of the message broker for consumption by the other one of the first release or the second release of the application service.

16. The system of claim 11, wherein the deployment management service is further configured to:

receive one or more modified settings for publishing messages for consumption by the first release and the second release of the application service; and transmit the one or more modified settings to the application management service, to cause the application management service to control publishing of messages according to the one or more modified settings.

17. The system of claim 11, wherein the deployment management service is further configured to:

receive a request to disable the first release of the application service;

transmit, to the message broker, a request to cause the second release of the application service to receive messages published to the first category of the message broker; and disable the application management service in the computing environment.

18. The system of claim 17, wherein the deployment management service is further configured to transmit, to the message broker, a request to remove the second category at the message broker.

19. The system of claim 11, wherein the application service is streamed to the computing environment, and wherein the application service is at least one of an application, a service, or a microservice.

20. A non-transitory computer readable medium storing instructions that, when executed by one or more processors, cause the one or more processors to:

receive, by a deployment management service executing in a computing environment having a first release of an application service for the computing environment, one or more settings for a second release of the application service;

configure, by the deployment management service, an application management service in the computing environment with the one or more settings;

transmit, by the deployment management service to a message broker, a request to cause the application management service to receive messages published to a first category of the message broker;

receive, by the application management service from the message broker, a message corresponding to the application service;

identify, by the application management service based on the message and the one or more settings, a second category of the message broker corresponding to one of the first release or the second release, to which the application management service is to publish the message; and publish, by the application management service, the message to the second category of the message broker for consumption by one of the first release or the second release of the application service.

* * * * *